US010028887B2

(12) United States Patent
Tobescu

(10) Patent No.: US 10,028,887 B2
(45) Date of Patent: *Jul. 24, 2018

(54) MONITORING PRODUCT INTEGRITY OF A PHARMACEUTICAL PRODUCT IN A VIAL USING A MINIATURIZED ELECTRONIC SENSOR TAG

(71) Applicant: Q-tag AG, Ganterschwil (CH)

(72) Inventor: Corneliu Tobescu, Wilen (CH)

(73) Assignee: Q-TAG AG, Ganterschwil (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/904,439

(22) PCT Filed: Jul. 15, 2014

(86) PCT No.: PCT/CH2014/000107
§ 371 (c)(1),
(2) Date: Jan. 12, 2016

(87) PCT Pub. No.: WO2015/006879
PCT Pub. Date: Jan. 22, 2015

(65) Prior Publication Data
US 2016/0166471 A1    Jun. 16, 2016

(30) Foreign Application Priority Data

Jul. 16, 2013    (CH) .................................... 1272/13

(51) Int. Cl.
*G08B 3/00*    (2006.01)
*A61J 1/18*    (2006.01)
(Continued)

(52) U.S. Cl.
CPC ............... *A61J 1/18* (2013.01); *A61J 1/1418* (2015.05); *A61J 1/16* (2013.01); *G06K 19/0717* (2013.01);
(Continued)

(58) Field of Classification Search
CPC .......... A61J 1/18; A61J 1/1425; A61J 1/1418; A61J 1/065; A61J 1/16; A61J 2200/70;
(Continued)

(56) References Cited

U.S. PATENT DOCUMENTS

| 7,978,564 B2 * | 7/2011 | De La Huerga .. A61M 5/14212 |
| | | 221/15 |
| 8,477,029 B2 * | 7/2013 | Ashrafzadeh ........ G06Q 10/087 |
| | | 340/540 |

(Continued)

FOREIGN PATENT DOCUMENTS

| JP | 2007-1663 | 1/2007 |
| WO | 02/095671 | 11/2002 |
| WO | 2006/016343 | 2/2006 |
| WO | 2011/032956 | 3/2011 |

*Primary Examiner* — Anh V La
(74) *Attorney, Agent, or Firm* — Rankin, Hill & Clark LLP

(57) ABSTRACT

The package for a pharmaceutical product includes a vial and an electronic tag for obtaining information relating to the integrity of the product as assessed from an exposure of the product to physical or environmental conditions during a time span. The tag is attached at or to a constituent of the vial; or at least a portion of the tag is integrated in a constituent of the vial. The tag includes an electronics unit including a control unit, a sensor unit including at least one sensor for monitoring the physical or environmental conditions, a display unit including a display for displaying data relating to the integrity referred to as status data and a switch. The control unit is structured and configured for effecting that the display unit displays the status data in reaction to an operation of the switch. A rip strip may be bonded to the vial body.

11 Claims, 7 Drawing Sheets

(51) Int. Cl.
  *G06K 19/07* (2006.01)
  *G06K 19/077* (2006.01)
  *A61J 1/16* (2006.01)
  *A61J 1/06* (2006.01)
  *A61J 1/14* (2006.01)

(52) U.S. Cl.
  CPC .......... *G06K 19/07798* (2013.01); *A61J 1/065* (2013.01); *A61J 1/1425* (2015.05); *A61J 2200/70* (2013.01); *A61J 2205/60* (2013.01)

(58) Field of Classification Search
  CPC ............ A61J 2205/60; G06K 19/0717; G06K 19/07798
  USPC ....... 340/691.6, 568.1, 691.1, 691.5, 309.16, 340/309.7, 309.4, 309.8, 572.1, 572.8; 29/407.09; 368/244, 277
  See application file for complete search history.

(56) References Cited

U.S. PATENT DOCUMENTS

| | | | |
|---|---|---|---|
| 9,750,868 B2* | 9/2017 | Tobescu | A61M 5/002 |
| 2004/0008123 A1* | 1/2004 | Carrender | G06K 19/07749 340/8.1 |
| 2005/0251431 A1 | 11/2005 | Schmidtberg | |
| 2006/0238341 A1* | 10/2006 | Commagnac | B65D 55/02 340/568.1 |
| 2007/0273507 A1 | 11/2007 | Burchell et al. | |
| 2007/0285229 A1 | 12/2007 | Batra et al. | |
| 2008/0272131 A1* | 11/2008 | Roberts | G01K 1/14 220/592.25 |
| 2011/0012742 A1* | 1/2011 | Johnson | G08B 21/24 340/669 |

* cited by examiner

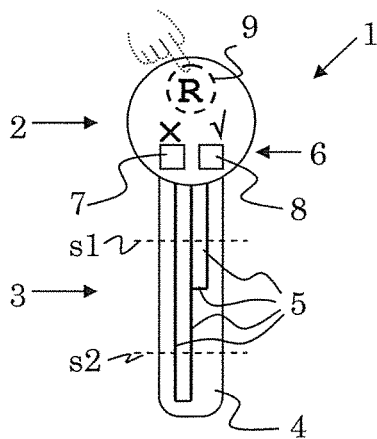
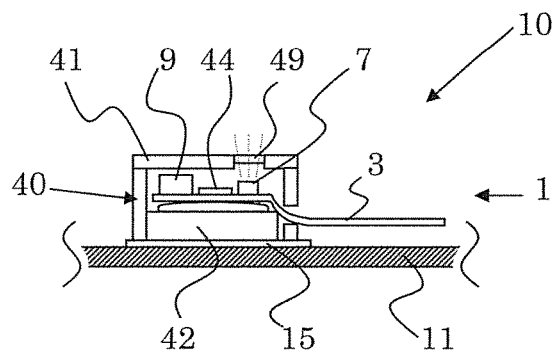
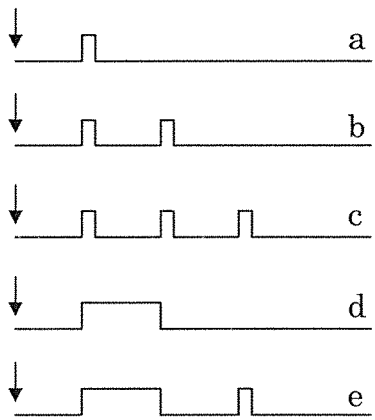
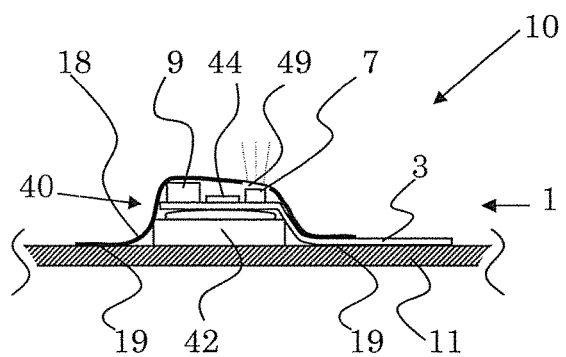
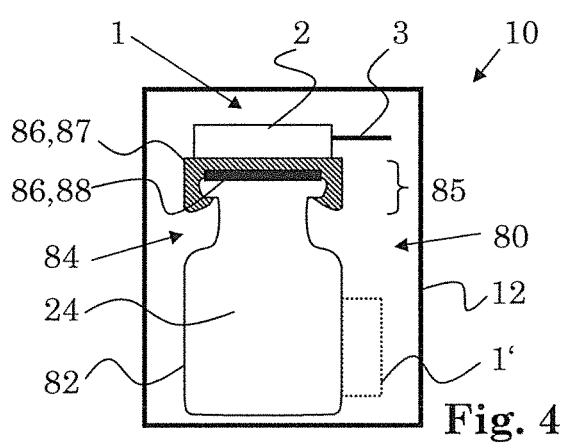
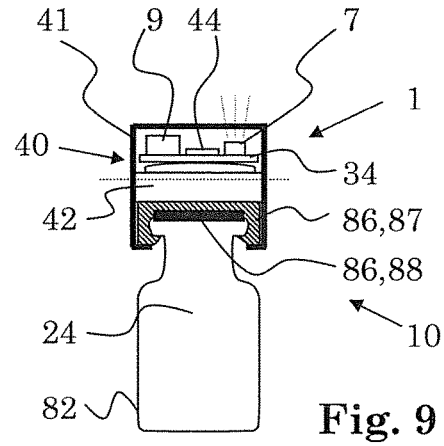
Fig. 1
Fig. 2
Fig. 5
Fig. 3
Fig. 4
Fig. 9

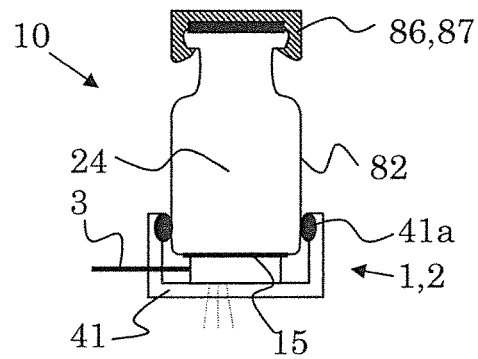
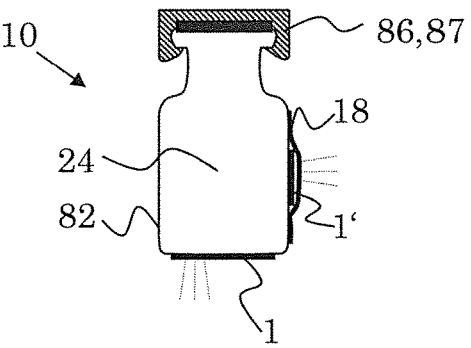
Fig. 25   Fig. 26
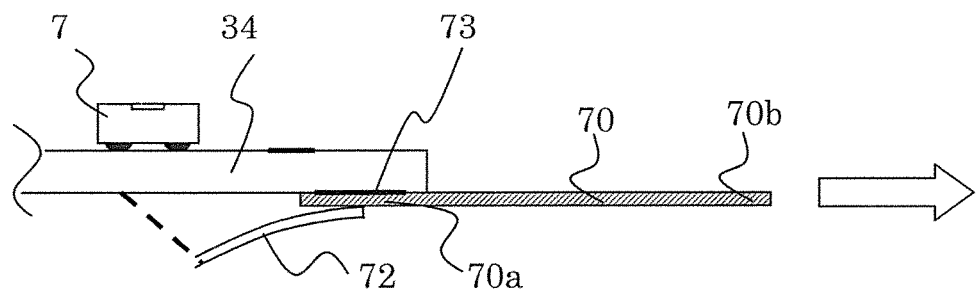
Fig. 27
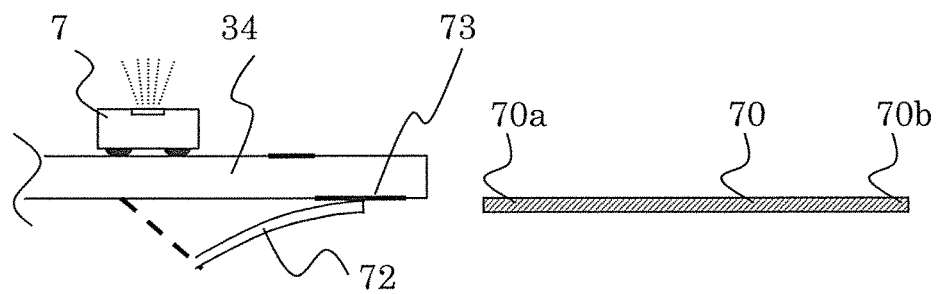
Fig. 28

MONITORING PRODUCT INTEGRITY OF A PHARMACEUTICAL PRODUCT IN A VIAL USING A MINIATURIZED ELECTRONIC SENSOR TAG

BACKGROUND OF THE INVENTION

Field of the Invention

The invention relates to the field of monitoring the integrity of pharmaceutical products that are sensitive to physical or environmental conditions. More specifically, it relates to the monitoring of the integrity of a pharmaceutical product in a vial. The invention relates to ways of estimating the integrity of a pharmaceutical product in a vial as assessed from the exposure of the product to physical or environmental conditions up to at least approximately the time of its use.

Description of Related Art

The invention relates to articles or devices that find application, e.g., when a patient taking a medicament or a health care specialist giving the medicament to the patients wants to make sure that the medicament has not perished, in particular not perished during the time span between packaging the medicament and applying the medicament.

When it comes to sensitive or delicate pharmaceutical products, it can be desirable to monitor their exposure to specific hazards such as particularly high or low temperatures, particularly high or low humidity (water-content of ambient air), or particularly strong impacts (hits, blows), so as to be able to estimate the integrity of the transported or stored goods.

It is known to use chemical indicators for estimating the temperature exposure of a medicament. For example, a particular chemical substance is applied onto a vial containing a pharmaceutical product. If that substance is exposed to a too high or too low temperature during a too long time, its color is (visibly) changed. Corresponding products are commercially available.

Furthermore, RFID tags are frequently used by transport and logistics companies for monitoring the integrity of various goods during their transport from the manufacturer of the goods to a distributor or wholesaler. Such RFID tags are, e.g., attached to a trading unit on a palette, and results of measurements carried out in the RFID tag, e.g., temperature measurements, are wirelessly transmitted to the RFID reader in order to be evaluated and/or looked at then.

SUMMARY OF THE INVENTION

One object of the invention is to create a new way of enabling a person (finally) using a pharmaceutical product in a vial such as a health care specialist, to check whether or not the product is—with a high probability—sound (flawless), in particular at (approximately) the time of using or of accessing it.

Another object of the invention is to provide a simple way of enabling a person to check the integrity of a pharmaceutical product in a vial, in particular approximately at the time of its use or approximately at the time of accessing it.

Another object of the invention is to provide a way of enabling a person to check the integrity of a pharmaceutical product in a vial, in particular approximately at the time of its use or access, which is compatible with already established packaging and distribution schemes.

Another object of the invention is to provide a way of enabling a person to check the integrity of a pharmaceutical product in a vial without requiring the presence of any additional object or tool for doing so, e.g., without a reading device.

Another object of the invention is to provide a way of minimizing the probability of fraud or deceit when it comes to prove or demonstrate an integrity status of a pharmaceutical product in a vial approximately at the time of its use or at the time of accessing it.

Another object of the invention is to provide ways for preventing or reducing malpractice in conjunction with monitoring the integrity of a sensitive pharmaceutical product in a vial.

Another object of the invention is to provide a particularly cost-effective way of monitoring the integrity of a pharmaceutical product in a vial and/or of enabling a person to check the integrity of a pharmaceutical product in a vial.

Another object of the invention is to provide a way of manufacturing a package for a pharmaceutical product or of a portion thereof, which has a particularly low number of manufacturing steps.

A corresponding package for a pharmaceutical product as well as a corresponding method for monitoring an integrity of a pharmaceutical product shall be provided. Furthermore a corresponding packaged pharmaceutical product, corresponding devices ("closure device" and "tag device") shall be provided as well as corresponding methods for manufacturing a package for a pharmaceutical product, and for manufacturing the devices.

Further objects emerge from the description and embodiments below.

The package for a pharmaceutical product includes:
- a vial;
- an electronic tag for obtaining information relating to the integrity of the product as assessed from an exposure of the product to physical or environmental conditions during a time span;

wherein
I) the tag is attached at or to a constituent of the vial; or
II) at least a portion of the tag is integrated in a constituent of the vial;
and wherein the tag includes an electronics unit including:
- a control unit;
- a sensor unit including at least one sensor for monitoring the physical or environmental conditions;
- a display unit including a display for displaying data relating to the integrity referred to as status data;
- a switch;

wherein the control unit is structured and configured for effecting that the display unit displays the status data in reaction to an operation of the switch.

Such a package can make possible that a user who wants to use or apply the pharmaceutical product (who usually is not a person trading it or dealing with it), such as a patient or a health care specialist, can in a simple and direct way and without further education and without needing further equipment or tools operate the tag and find out about the integrity of the pharmaceutical product, in particular at (approximately) the time of using (in particular applying) or accessing the product. And the package can be very compact and cost-efficient.

The term "package" is used in a rather wide sense, as already the vial with attached tag is considered a package, since the pharmaceutical product to be contained in the vial (usually in a vial body of the vial) can be considered to be packaged thereby. However, as will become clear, the package can also be a package in a narrower and more conventional sense, such as a package including an outer package such as a cardboard box or a polymer blister inside of which the vial is present.

The constituent of the vial may in particular be at least one of:
a vial body of the vial;
a closure of the vial;
a part of a closure of the vial;
a seal of the vial, e.g., a crimp or a stopper;
a cap of the vial.

In the above configuration I), the tag is attached to or at a constituent of the vial. In this case, the constituent can be a separate part to or at which the tag is fixed, usually by fixing at least a constituent of the tag, such as a housing of the tag or a rip strip of the tag, at or to the constituent of the vial.

The attaching may be accomplished, e.g., by means of a bonding agent present between the respective constituent of the vial and the respective part or constituent of the tag.

Or the attaching is accomplished by clamping at least a portion of the tag between the constituent of the vial and a foil or a strap, in particular wherein the strap surrounds the constituent of the vial. For example, the strap may be a foil or an adhesive tape or a flexible or elastomeric strap or a shrink hose, in particular a heat shrink hose.

Or the attaching is accomplished by form-fitting, e.g., wherein the part of the tag fully or partially encompasses the respective constituent of the vial, or wherein at least a portion of the constituent of the vial is at least partially encompassed by the tag or by a constituent of the tag, more specifically by a housing of the tag.

Specifically, it may be provided that the tag is attached to or at the constituent of the vial, and at least a portion of the constituent of the vial is at least partially encompassed by the tag or by a constituent of the tag, more specifically by a housing of the tag. And in particular, the constituent is a cap or a crimp of the vial.

Configuration I) can be considered a "retrofit" solution. Configuration I) can allow to use conventional vials for producing the package.

In the above configuration II), at least a portion of the tag (or a constituent of the tag) is integrated in a constituent of the vial. This may be accomplished, e.g., by providing that the portion of the tag is contained in the constituent of the vial, or by providing that the portion of the tag establishes the constituent of the vial or, vice versa, that the constituent of the vial establishes a portion of the tag.

More concretely, the electronics unit or a portion thereof may be contained in a closure of the vial such as in a cap or in a seal of the vial; or a housing of the tag is established by or establishes a closure of the vial or a part of a closure of the vial such as a cap or a seal of the vial. For example, a single injection molded part may house at least a portion of the electronics unit and function as a closure or a part of a closure, e.g., as a cap or as a seal of the vial.

Configuration II) can be considered an "integrated" solution. Configuration II) can allow to minimize the number of assembling steps required for producing the package and/or to minimize the number of parts that have to be produced for producing the package. It may also be possible to reduce the size of the package and/or the amount of material required for producing the package when selecting configuration II).

Further details and possibilities are described below.

As is usually the case for tags for integrity monitoring, it is assumed that the monitored pharmaceutical product is exposed to approximately the same physical or environmental conditions as is the tag.

The time span usually is a time span during which the product is stored or transported.

The switch usually is a user-operable switch, a human-operable switch. Suitable switches can be, e.g., electro-mechanical switches or capacitive switches. These can be particularly cost-effective and very small. However, magnetic switches and inductive switches may be applied, too, in particular in case use is made of printed electronics. The switch may render superfluous the use of (additional or external) tools for receiving information about the integrity of the pharmaceutical product.

The switch may in particular be operable by touching it, and/or it may be operable by pressing or pushing it, and/or it may be operable by approaching it, e.g., approaching it to less than 1 cm or less than 4 mm, e.g., in case of a capacitive switch. The touching, pressing, pushing, approaching may be accomplished, e.g., with a finger.

The display usually is a visual display.

The displaying the status data in reaction to an operation of the switch is effected at least after the end of the time span. This can make possible to review the integrity status the product had, e.g., when the pharmaceutical product was accessed or used. It may, however be provided that the displaying the status data in reaction to an operation of the switch is also effected already before the end of the time span, as in the example above. This can make possible early checks of the product integrity, in particular before accessing or applying the pharmaceutical product or before puncturing or opening a septum or a stopper of the vial.

The display does usually not permanently display the status data. This saves energy and thus makes possible a long operation duration of the tag and thus a long shelf life of the package and the tag.

Furthermore, it can be provided that displaying the status data takes place only in reaction to operating the switch. However, it may also be provided that it takes place also in reaction to terminating the monitoring and thus at the end of the time span. (Termination of the monitoring may take place in reaction to breaking a breakable electrical connection described further below and a detection of the breaking.) And alternatively or additionally thereto, it may be provided that displaying the status data takes place periodically, e.g., in regular time intervals, the (pause) interval typically being between 1 second and 2 minutes, in particular between 5 seconds and 30 seconds. Such an "automatic" display of the status data may take place after the end of the time span only or during the time span only or both, i.e. from the beginning of the time span. Looking at the display in the right moment (or waiting for up to once the pause interval) may thus dispense with operating the switch when the integrity status shall be checked. However, the switch may be operated in order to have the status data displayed.

Status data displayed after the monitoring (or measuring, or sensing) has been terminated, i.e. after the end of the time span, may be referred to as "final" status data. In case of final data, all alarms may be indicated which occurred between the initial point in time at which monitoring began and the time of termination of the monitoring. It is furthermore possible to provide that these "final" status data are also displayed (even without operating the switch) when the monitoring is terminated. This makes possible an immediate check of the integrity status. And a calculation and/or a storing step may also take place at that time, so as to obtain these "final" status data and store them in the tag, so as to readily have access to them later on.

If it is provided that status data may be displayed by the display already during the time span, e.g., in reaction to operating the switch, these status data certainly merely reflect those alarm conditions which were met up to that instant.

Furthermore, it is also possible to provide that in addition to displaying status data by means of the display (or as an alternative thereto), status data can be transmitted by the tag via electro-magnetic radiation in the radio-frequency (RF) range (radio-frequency radiation).

In one embodiment, the tag, in particular the electronics unit, includes an RF receiver and an RF transmitter, or an RF transceiver, and the control unit is structured and configured for effecting that the status data are transmitted using the RF transmitter or the RF transceiver. It may be provided that this transmission of status data is effected in reaction to an operation of the switch, or in reaction to receiving, in the tag, a corresponding request signal by means of the RF receiver or RF transceiver, or in both these ways. An RF reading device may, this way, receive status data from the tag, in a contact-less fashion. This may be of advantage when a large number of vials shall be examined with respect to their individual product integrity.

In one embodiment which may be combined with the before-mentioned embodiment, the tag includes no RFID (Radio Frequency Identification) responding capability. However, it is, as an alternative also possible to provide that the tag includes RFID responding capability:

In one embodiment, which may be combined with one or more of the before-mentioned embodiments except for the last-mentioned one, the tag includes RFID (Radio Frequency Identification) responding capability. For example, the tag (in particular the electronics unit) includes an RF receiver and an RF transmitter, or an RF transceiver. This may allow to identify in a contactless fashion, each individual tag and thus each individual vial. In this case, each tag may be provided with a unique identifier, which typically would be stored in the electronics unit, and which can be transmitted by the tag via RF, e.g., to an RFID reader. This may allow to achieve a quick overview over a large number of vials, e.g., in order to check which vials are present (and thus, which vials would possibly be missing).

In one embodiment, however, the tag has no wireless communication capability; the tag is free of a wireless communication receiver and free of a wireless communication emitter. Wireless communication presumes the existence of a communication protocol and thus is not related to switches which are operable in a contact-free manner as described elsewhere in the present patent application.

The pharmaceutical product can be, e.g., a synthetic pharmaceutically active substance, a natural pharmaceutically active substance, and in particular a vaccine. Vaccines are often very delicate and also expensive, such that efforts for monitoring the integrity of vaccines in vials can be particularly useful, in particular when the vaccines are intended for use in subtropical or tropical regions.

The pharmaceutical product can be intended for human use, but it can be also be a pharmaceutical product for use with animals, i.e. a veterinary pharmaceutical product. The invention will mainly be described for the case of pharmaceutical products for human use, but it is readily understood how the invention applies for veterinary pharmaceutical products.

The vial can be, in particular, a serum vial or an injection vial.

The vial usually includes or even consists of a vial body and a closure.

It is usually provided that the vial body has a fixed (stationary) bottom (i.e. a fixed bottom wall or bottom side), in particular wherein that bottom is arranged at an end of the vial body opposite to an opening of the vial (which opening may be closed by the closure).

The vial usually is different from a syringe and different from a part of a syringe.

The vial has a vial body, which usually has no more than one single opening. And typically, the closure is a closure for closing that single opening.

The vial usually has a fixed (constant) volume.

The vial body usually is provided for containing the pharmaceutical product.

The vial body usually is made of glass, but polymeric vial bodies, e.g., made of polypropylene, are also possible.

The closure usually includes a seal and may (optionally) include a cap.

Usually, the closure is not an item (such as a stopper or a bung) for displacing a pharmaceutical product present inside the vial and/or for forcing the pharmaceutical produce out of the vial. In particular, the closure usually is neither a stopper nor a bung.

The seal can include, e.g., a septum or a stopper. The seal usually includes an elastomeric material. For example, a septum can be made of PTFE or of a rubber material. And a stopper typically is made of a rubber material. Rubber materials are, e.g., natural rubber, butyl rubber and silicone. The seal may also include a crimp for protecting and/or fixing (to the vial body) a septum or a stopper of the closure. The crimp usually is substantially made of (and at least comprises) a metal. The metal can in particular be aluminium or an aluminium alloy.

Very common are seals including an aluminium or aluminium alloy crimp and a septum or a stopper.

The cap can be provided for protecting the seal. It may alternatively or additionally be provided for fixing the seal (to the vial body), in particular when no crimp is provided, e.g., when the seal merely is a stopper. Caps can be made, e.g., of a polymer material. Various types of caps can be provided such as tear-off caps, flip-off caps, snap caps, screw caps.

The vial may be, e.g., a lip vial including a stopper—and optionally a cap.

The vial may be a crimp vial including a crimp.

In one embodiment, which may be combined with one or more of the before-mentioned embodiments in which the tag is attached to or at a closure of the vial or a part thereof such as to or at a cap or a seal, a bonding agent is present between the closure of the vial or the part thereof (e.g., the cap or the seal) on the one hand and the tag on the other hand. This way, the tag can be quickly and cost-effectively attached. The bonding agent may be a double-sided adhesive tape, but a glue can also be used as the bonding agent.

In one embodiment, which may be combined with one or more of the before-mentioned embodiments in which the tag is attached to or at a closure of the vial or a part thereof such as to or at a cap or a seal, the tag includes a housing, and at least a portion of the closure is contained in the housing. This is another way of attaching the tag or of fixing the tag to the closure (e.g., to the cap or to the seal). In this case, the closure is (at least in part) present inside the housing. And this may provide for a mutual fixture of tag and closure. An additional bonding agent may be present of not.

The attaching the tag at or to a constituent of the vial (cf. configuration I)) can be accomplished by, e.g., bonding, gluing, using a fluidly applicable glue, using a double-faced adhesive tape, using a polymer cover foil sandwiching the tag between itself and the respective constituent of the vial and including a circumferential portion surrounding the tag, which is bonded to the respective constituent of the vial, or in another way.

In one embodiment, which may be combined with one or more of the before-mentioned embodiments, the constituent of the vial is a vial body. In this case, usually configuration I) applies, and in particular, the tag can be attached to a bottom wall of the vial body. But it is also possible to attach the tag to a side wall of the vial body. It is, more particularly, possible to provide that a bottom of the package is established by at least a portion of the tag, in particular by a housing of the tag. In this case, the display will usually be present (an visible) at the bottom of the tag and thus at the bottom of the package.

In one embodiment, which may be combined with one or more of the before-mentioned embodiments except for the last-mentioned one, the constituent of the vial is a closure of the vial or a part thereof. In particular, the constituent of the vial can be a seal of the vial such as a stopper (with or without a crimp) or a septum (with or without a crimp), but the constituent of the vial can also be a cap of the vial such as a flip cap, a screw cap, a snap cap.

More particularly, the tag may be bonded to a cap of the vial, cf. also configuration I) above. This allows to retrofit many of today's commercially available vials.

It is also possible to provide that the tag is bonded (cf. configuration I) above) to a seal of the vial. In this case, it is possible to have the tag bonded to a crimp.

A tag may in particular be bonded to a portion of a crimp, which is predetermined to be removed for accessing a septum or stopper fixed by the crimp. The portion may, e.g., be at least partially (or rather completely) surrounded by one or more (predetermined) breaking locations such as by a number of (predetermined) breaking points and/or by a (predetermined) breaking line. In this case, it can be provided that access to a septum or a stopper of the vial (and thus to the pharmaceutical product) is provided only if the tag is removed from the vial (provided that only predetermined measures or at least no unusual measures are taken for achieving access to the septum or the stopper).

It is also possible to provide a snap fit between the tag and a constituent of the vial, in particular a snap fit between a housing the tag and a constituent of the vial. In this case, the constituent may in particular be a cap, a crimp, or the vial body, which in that case may in particular have a neck and/or a lip. Typically, in these cases, at least a portion of the respective constituent of the vial is at least partially encompassed by the tag.

If the tag (or more particularly the tag housing) establishes a snap fit with a cap of the vial, a retrofit solution for currently commercially available vials may be achieved.

Also if the tag (or more particularly the tag housing) establishes a snap fit with a crimp of the vial, a retrofit solution for currently commercially available vials may be achieved. In addition, a cap may be dispensed with or the tag may function as a (protective) cap.

Also if the tag (or more particularly the tag housing) establishes a snap fit with the vial body, a retrofit solution for currently commercially available vials may be achieved. In addition, the tag (and more particularly the tag housing) can function as a cap or as a crimp.

In one embodiment, which may be combined with one or more of the before-mentioned embodiments in which configuration II) may apply, the constituent of the vial constitutes or establishes the at least one portion of the tag. This can enhance manufacturability of the package, e.g., by reducing the number of assembly steps and/or by reducing the number of parts to be manufactured. Two different functions, a tag-related function and a vial-related function can thus be fulfilled by one and the same item. For example, a closure or more specifically a cap of the vial or a seal of the vial may establish a housing of the tag. Furthermore, it may be provided that a closure, e.g., a cap or a seal of the vial, contains a portion of the tag such as the electronics unit or a portion thereof.

In one embodiment, which may be combined with one or more of the before-mentioned embodiments in which configuration II) may apply, the constituent of the vial contains the at least one portion of the tag. This may simplify producing the tag and/or reduce the amount of material required for producing the package. The tag or a portion thereof can be at least partially enclosed by the constituent of the vial. The constituent of the vial (e.g., a cap or a seal) may establish a housing for the tag or for a portion thereof such as for the electronics unit or a portion thereof.

Referring to configuration II), cf. above, the tag may in particular be integrated in a cap of the vial or in a stopper of the vial.

For example, a stopper of the vial may include a hollow for uptake of at least a portion of the tag such as for the electronics unit of the tag or for a portion thereof. It may be provided that the hollow is open to the outside of the vial body and completely closed to the inside of the vial body (when the stopper is inserted in the vial body). This can make possible to provide the vial with the tag after sterilizing the stopper and the vial body; an exposure of the tag to a sterilization procedure can be avoided.

Or, a housing of the tag can at least partially coincide with a cap of the vial. A housing of the tag may establish a cap of the vial, and/or a cap of the vial may establish a housing of the tag or a portion thereof. An exposure of the tag to a sterilization procedure can be avoided this way. And the number of parts to be produced and assembled for manufacturing the package is reduced.

In one embodiment which, may be combined with one or more of the before-mentioned embodiments, the tag includes a housing including a first and a second housing portion which are mutually attached, in particular they may be establishing a snap fit with one another. This way, e.g., the electronics unit can be readily inserted into the housing. In addition, this may very much facilitate attaching the tag to or at the constituent of the vial. In case the tag includes a rip strip, the housing may include an opening through which the rip strip extends out of the housing. The opening may in particular be present at a location where the first and a second housing portions are proximate, e.g., the opening being defined by one or both, the first and the second housing portion. This may facilitate assembling the package.

In particular, it may be provided that the first and second housing portions are interconnected by a folding portion. The folding portion may make possible a tilting of the first versus the second housing part, in particular due to a resilience or elasticity of the folding part, wherein this resilience or elasticity may be due to a reduced thickness of the folding portion with respect to adjacent regions of the first and second housing portions. Such a tilting can take place in a well-defined way. Thus, during manufacture and more particularly during mutually attaching the first and second housing portions, no particular positioning or alignment steps have to be carried out and no particular positioning or aligning measures have to be taken in order to ensure a safe and precise mutual fitting of the first and second housing portions. This greatly facilitates manufacture of the package.

In configuration I), it can in particular be provided that a cap of the vial is at least partially encompassed by the housing (when the first and second housing portions are fixed to each other, i.e. when the snap fit is closed, which usually means that the housing is closed). This way, an attaching of the vial may be accomplished without the need of providing a bonding agent between tag and cap.

In configuration II), it can in particular be provided that a closure or a part of a closure of the vial such as cap of the vial or a seal of the vial is established by the housing of the tag. Vice versa, one could say that the tag or a portion thereof is established by a closure of the vial, e.g., by a cap or by a seal of the vial, because the closure (and more specifically the cap and the seal, respectively) establishes the housing of the tag.

The housing may furthermore be one single unitary or integrally formed part. It may be, e.g., one single molded part such as an injection molded part. It can be a continuous part. This can greatly facilitate the manufacture of the package, since less parts need to be manufactured, and less parts need to be assembled. In configuration II), the complete housing of the tag plus the closure or the part of the closure may be a single continuous (integrally formed) part, e.g., a single molded part. More specifically, the complete housing of the tag plus the cap or plus the seal may be a single continuous (integrally formed) part, e.g., a single molded part.

In one embodiment, which may be combined with one or more of the before-mentioned embodiments, the tag includes a housing (which may or may not include the first and a second housing portions, cf. above, and may or may not be integrated in the vial), and the housing includes a flexible portion structured and arranged for interacting with the switch. The flexible portion can be provided for making possible to operate the switch through or across the housing. It can be deformable so as to allow to apply force to the switch via (or through) the flexible portion and/or to approach the switch more closely than without deforming the flexible portion. These properties can be valuable in particular in case of electro-mechanical switches and also of capacitive switches.

The flexible portion can be realized by providing a slit in the housing defining the flexible portion. The flexible portion may constitute a tongue in the housing, wherein the tongue substantially is the flexible portion. The tongue has at least one free end. At another end, it usually is continuous with a further part (or with the rest of the housing).

The flexible portion can furthermore be realized by providing an area of reduced material thickness (nearby the switch). If the thinness of the flexible portion enables a deformation thereof allowing to operate the switch via the flexible portion, a provision of slits in the housing for defining the flexible portion or a tongue may be dispensed with.

It is furthermore possible to provide a housing, which is generally flexible or elastically deformable (e.g., due to material thickness and/or material selection) so as to allow to operate the switch through the housing. In this case, the housing may be substantially identical with the flexible portion.

As an alternative to providing the flexible portion, it is also possible to provide an opening in the housing providing access to the switch. For inductive and for magnetic switches, but also for capacitive switches, it may even be completely dispensed with special provisions concerning shape or material of the housing for facilitating operating the switch.

In one embodiment, which may be combined with one or more of the before-mentioned embodiments, the tag includes a housing (which may or may not include the first and a second housing portions, cf. above, and which may or may not include the flexible portion, cf. above, and which may or may not be integrated in the vial), and the tag includes a battery, and the housing includes a holder for holding the battery. In the above-described case of a provision of the first and second housing portions, the holder may be provided in the first or in the second or in both, the first and second housing portions.

The holder may in particular be or provide a clamping fixture. Clamping the battery in the housing can provide a precise and mechanically sufficiently stable alignment of the battery with respect to the housing—and thus also with respect to features of the housing such as openings or windows (such as windows for light emission). Furthermore, provided that the battery is mounted on a printed circuit board (PCB), e.g., using battery leads, also that PCB and thus also other components mounted on the PCB are aligned with respect to the housing. Typically, a single PCB is provided, which is provided in the electronics unit and on which also all other components of the electronics unit are mounted such as LEDs or other display components and a controller chip, one or more capacitors and the like. The one PCB may (cf. below) also establish the rip strip, if present.

The holder and/or the clamping fixture may include, e.g., one or more protrusions or ribs present inside the housing.

The battery is usually provided for powering other constituents of the electronics unit.

Instead of a battery, one could also provide a different storage unit for providing electric energy.

In one embodiment, which may be combined with one or more of the before-mentioned embodiments, the tag includes a printed circuit board (PCB) for interconnecting components of the electronics unit. In particular, the PCB is a flexible PCB, e.g., based on a polymer foil. It may be identical with or continuous with a rip strip of the tag (if present).

Instead of realizing components of the tag (in particular parts or all of the electronics unit) in form of conventional electronic components on a conventional rigid or (rather) flexible printed circuit board, it is also possible to realize components of the tag using printed electronics. Printed electronics is a relatively new technology for producing electronics, in which one or more printing technologies suitable for defining patterns on a substrate are used for producing electronic components and circuits. Such printing technologies can be, e.g., screen printing, flexography, gravure, offset lithography, inkjet technology. In this case, it may even be possible to dispense with a battery manufactured separately from other components of the tag (and in particular of the electronics unit) and, instead, provide a printed battery. Such a printed battery can be manufactured together with further components of the tag (in particular of the electronics unit) using printing technologies for printed electronics. Printed electronics makes possible to produce much smaller tags and may even be more cost-efficient in mass production.

In case of tags (and in particular of an electronics unit) based on printed electronics, the switch may in particular be one that is operable in a contact-free fashion such as a capacitive switch, a magnetic switch or an inductive switch.

In case a rip strip is provided, it may in particular be continuous with the substrate of the printed electronics.

In one embodiment, which may be combined with one or more of the before-mentioned embodiments, the tag includes a rip strip including a breakable electrical connection operationally connected to the control unit. The rip strip can be used for indicating (to the control unit) the end of the time span, or for indicating (to the control unit) the beginning of the time span, or for both. This may be accomplished, e.g., by suitably cutting or tearing apart the rip strip.

It is usually provided that when the rip strip is ripped (in a suitable place), the electrical connection is broken, e.g., because one or more conductor lines (in particular a conductor line loop) of the rip strip is interrupted. This can be detected by the control unit, e.g., by sensing an increase of an ohmic resistance. It may be an indication of an end of the time span, and thus, the monitoring can be terminated in reaction thereto.

The rip strip usually is a flat member (its extension in a first dimension being clearly smaller than in the other two) and has an elongated shape (its extension in a second dimension being smaller than in the third dimension). The breaking the electrical connection usually takes place by dividing (cutting, tearing apart) the rip strip generally along the second dimension.

In one embodiment referring to the last-mentioned embodiment, the rip strip includes or essentially is a printed circuit board (PCB). It may in particular include or essentially be a flexible printed circuit board. And more particularly it may include or essentially be a foil in and/or on which at least one conductor line is present which is operationally connected to the control unit. The at least one conductor line forms or establishes the breakable electrical connection and it may in particular describe a loop. The foil may in particular be an electrically insulating polymer foil. The (usually flexible, but possibly rigid) PCB of the rip strip may be continuous with a PCB of the electronics unit.

In one embodiment referring to one or both of the two last-mentioned embodiments, the rip strip is attached to or at the outside of the vial body.

It may be provided that the rip strip includes a foil and, present on the foil, at least one conductor line operationally connected to the control unit. In particular, the at least one conductor line may form or establish at least one loop. Typically one or two loops, perhaps three are provided. Each loop may constitute one breakable electrical connection. In case of a single loop, the interruption thereof usually will indicate that the product is about to be accessed and/or indicate that the end of the time span has come (and the monitoring is terminated). In case of two loops, the first is like the before-described single one, and the interruption of the second loop usually will indicate that the product is about to be packaged (or has just been packaged) and/or indicate the beginning of the time span (and thus the start of the monitoring). In case of three loops, yet another functionality may be added to those of the before-described ones.

It is noted that instead of (or in addition to) terminating the time span by ripping a rip strip of the tag, a functionality (provided by the control unit) can be provided that the monitoring is terminated in reaction to an operation of a switch we shall refer to as terminating switch. That terminating switch may be identical with or different from the switch ("display switch") for effecting the displaying of the status data (if present). If the switches are identical, different effects may be provoked by differently operating the switch. For example, a brief operation of the switch (e.g., for at most 1 or 1.5 seconds) provokes a displaying of the status data, whereas a longer operation (e.g., for more than 8 seconds) effects a termination of the monitoring. It is furthermore possible to provide a single switch, which fulfills at least three different functions accessible by differently operating the switch. These functions may in particular be: starting the monitoring; terminating the monitoring; requesting a displaying of the status data (usually during the whole time span and thereafter, too, namely then displaying the "final" status data, cf. below for details of the "final" status data). The different ways of operating may be operating the switch for time durations in different non-overlapping time duration intervals. For example, operating the switch for less than 2 seconds is interpreted by the control unit as a request for displaying status data, operating the switch for a duration between 3 and 6 seconds is interpreted by the control unit as a request for starting the time span (and thus the monitoring), and operating the switch for more than 9 seconds is interpreted by the control unit as a request for ending the time span and thus terminating the monitoring.

In addition to providing a rip strip or as an alternative thereto, the tag may include a pull-out tab or separating element. The pull-out tab or separating element may be used for starting the sensor measurement and/or a time measurement (cf. below).

The corresponding package is characterized in that the tag includes an element for electrically separating electrical contact elements, referred to as separating element, wherein a portion of the separating element is removably arranged between two electrical contact elements (a first and a second electrical contact element) of the tag (more particularly of the electronics unit) operationally connected to the control unit, in particular wherein the portion is electrically insulating.

For example, the separating element may have an electrical insulating end for separating the two electrical contact elements.

It may in particular be provided that a closing of an electrical contact established between the two electrical contact elements indicates the beginning of the time span. Thus, when the separating element is removed from between the two electrical contact elements, the sensor measurement (and/or the time measurement) is started, as controlled by the control unit.

The separating element may, e.g., include an electrically insulating portion, in particular, wherein the electrically insulating portion is made of electrically insulating material, and more particularly is formed by an electrically insulating foil or an electrically insulating member having a sheet shape.

The separating element may, e.g., substantially be a foil or sheet of an electrically insulating polymer.

The separating element may, e.g., substantially be a piece of foil, a piece of sheet shape, or a strip; in particular made of an electrically insulating material.

The package and/or the tag may, e.g., include a first and a second electrical contact element, wherein the separating element and the first and second electrical contact elements are structured and arranged such that:
  when the portion of the separating element (which usually is an electrically insulating portion) is arranged in a location between the first and second electrical contact elements (wherein it is usually clamped in between these electrical contact elements), the first electrical contact element is electrically separated from the second contact element; and
  when the electrically insulating portion is removed from the location, the first and second contact elements are allowed to be in electrical contact with each other.

One portion, in particular one end, of the separating element may be manually accessible. However, it is also possible to provide that the separating element has a first end and, distant therefrom, a second end, the first end being located between the first and second electrical contact elements, electrically separating these from each other, the second end being attached to a constituent of the vial, in particular to the vial body or to the closure. This may, similarly as described for rip strip, effect an unavoidable start of the measurement when the pharmaceutical product is accessed (in a usual way).

It is possible to provide that one of the two electrical contact elements separable by the separating elements is an electrical contact of a battery of the tag (or of another source of electrical energy of the tag) or is a lead contact for electrically contacting the battery (or other energy source).

The two electrical contact elements may in particular form a spring-loaded contact, such that with the separating element removed from between them, they will form a closed electrical contact.

With a separating element provided, the method for manufacturing a package for a pharmaceutical product which will be described in detail below, may include the following additional step:

inserting between a spring loaded pair of electrical contact elements of the tag a first portion of a separating element for electrically separating these electrical contact elements from each other.

And, in addition, the method may also include the step of:
attaching a second portion (which is different from the first portion) to a constituent of the vial, in particular to the vial body and/or to the closure.

In one embodiment, which may be combined with one or more of the before-mentioned embodiments, the package includes an outer package in which the vial and the tag are contained. The outer package may be a cardboard box and more particularly a folding carton. It is also possible to provide an outer package substantially made of a polymer, e.g., a blister-type or bag-type polymer package—which usually is air-tight. It is also possible to provide a two-level outer package such as a cardboard box containing a polymer package, e.g., of the before-described kind, which again contains the vial and the tag.

In one embodiment, which may be combined with one or more of the before-mentioned embodiments, the display unit is structured and configured for displaying the status data by flashing. In other words, the status data are encoded in flashing.

In one embodiment, which may be combined with one or more of the before-mentioned embodiments, the display unit includes one or more light emitters for emitting light pulses, and wherein the data is encoded in a sequence of light pulses emitted by the one or more light emitters. This can allow to realize the tag and thus also the package in a particularly small and particularly cost-efficient way, and it may simplify the manufacture of the tag. The data may more particularly be encoded in one or more of:

the color of the light pulses;
a duration of the light pulses;
the number of the light pulses in the sequence.

Such a display can be particularly energy-saving and space-saving, thus enabling a miniaturized tag having a long operation time.

The light emitters may in particular be light emitters for selectively emitting light of at least two different colors. For example, a light source for emitting green light and a light source for emitting red light may be provided.

The light emitters may be, e.g., LEDs (light emitting diodes). LEDs have a low power consumption which can contribute to a long operating duration of the tag.

Usually, the tag includes merely exactly one display (and not an additional one).

In view of the above-described (and below-described) ways of realizing the display, it is possible to provide that the display is a not-graphical display, at least in the sense that a graphical display would allow to visualize a plurality of different shapes (such as shapes symbolizing letters and/or numbers).

Providing a display of the above-described kind may allow to dispense with graphical displays, at least in the sense that a graphical display, would allow to visualize a plurality of different shapes (such as shapes symbolizing letters and/or numbers). However, it is also possible to provide a tag with such a graphical display, e.g., a liquid crystal display.

In one embodiment, which may be combined with one or more of the before-mentioned embodiments, the display automatically displays the status data periodically. The displaying may take place, e.g., in intervals of at least 1 second, more particularly of at least 5 seconds, and/or of at most 2 minutes, more particularly of at most 40 seconds. This may make dealing with the package easier, but usually at the expense of battery power.

In one embodiment, which may be combined with one or more of the before-mentioned embodiments, the control unit is structured and configured for receiving data or signals from the sensor unit, the data or signals being indicative of currently present physical or environmental conditions, and for obtaining the status data from these data or signals. In order to accomplish the latter, the status data are usually obtained in dependence of prescribed limitations for the exposure of the product to the physical or environmental conditions. Those prescribed limitations are usually stored in the tag, in the electronics unit, in form of corresponding data. For example, the control unit usually will compare the current conditions to threshold values such as a value that shall never be exceeded and/or a value that shall never be fallen short of and/or a value that may be exceeded (or fallen short of) only for less than a prescribed time duration. If an alarm condition is met because of extreme values (or extreme values during a too long time duration), it must be assumed that the integrity of the product is not present anymore, i.e. that the product is not in sound condition anymore. This fact can be indicated by the display of the tag, wherein it is possible to provide that different types of alarm conditions are indicated by the display in different ways.

Accordingly, the status data are usually indicative of events (in particular failures) that have occurred after an initial point in time, namely after the moment when the integrity monitoring has started, i.e. after the beginning of the time span. Status data usually reflect only events (in particular failures) that have occurred during the time span. A failure usually is a deviation from or transgression of the above-mentioned prescribed limitations, e.g., an exceeding of a threshold value.

In one embodiment referring to the before-mentioned embodiment, data representative of the prescribed limitations are programmable. Usually, such data are stored in the electronics unit, and in case they are programmable, there is no limitation to one (i.e. to a single) set of such data. This can make possible to use one and the same tag for different products of different sensitivity to the physical or environmental conditions. Thus, it can be sufficient to store only tags of a single type for many different products instead of one type of tag for each type of product.

In one embodiment referring to the before-mentioned embodiment, the tag includes a rip strip (e.g., of an above-described kind) including at least two contact pads (providing electrical contacts) which are operationally (usually electrically and more particularly galvanically) connected to the control unit, and the data representative of the prescribed limitations are programmable by means of signals (usually digital signals) applied to the contact pads.

In a first possibility, it can be provided that one of a plurality of sets of such data representative of the prescribed limitations are selectable by the applied signals. Those sets of data (including at least one value each, such as a maximally allowed temperature) are in this case usually stored in the electronics unit. Accordingly, sufficient memory space for the plurality of data sets is required in the electronics unit. However, programming may be accomplished rather rapidly this way. For example, if a specific type of tag shall be used for monitoring one of various, e.g., twenty, different pharmaceutical products, each having different prescribed limitations, a corresponding number of sets of, e.g., threshold temperatures (and possibly also time durations), may be stored in the electronics unit, and when a specific product shall be monitored, the signals applied to the contact pads allow to select the suitable set of data, such that these are applied in the subsequent monitoring.

In a second possibility, the data representative of the prescribed limitations are entered into the electronics unit by applying the signals. This provides additional flexibility and requires only relatively little storage space in the electronics unit. The programming, however, may be more time consuming than in case of the first possibility.

Referring again to the contact pads, it can be provided that these are arranged in such a location of the rip strip that they are removed from the tag when the rip strip is ripped for indicating that the monitoring shall start, i.e. for indicating the beginning of the time span. As has been described further above, a first and a second loop may be provided, a detection of an interruption of the second loop indicating the beginning of the time span. The contact pads may, thus, in particular be located, with respect to a coordinate from the control unit along the extension of the rip strip (which usually is a coordinate along the direction of the largest extension of the rip strip), at a location beyond the location of that portion of the second loop, which is located farthest along the coordinate. A ripping of the rip strip along a direction approximately perpendicular to the coordinate by which the second loop is opened (interrupted) will thus usually also result in a cutting off of the contact pads from the tag. Attempts to try to program the tag (more particularly to program data representative of the prescribed limitations) after monitoring has started can be impeded this way.

It is to be noted that, generally, it would also be possible, as an alternative or as an addition to the described programming tags, to provide a contactless programming, e.g., via electromagnetic radiation, in particular in the radio frequency range. This might, with respect to the above-described provision of contact pads for programming, result in a less time-consuming programming (programming possibly taking place simultaneously with other process steps during packaging) and in higher tag manufacturing costs and possibly also in larger outer dimensions of the tag, more particularly of a main part of the tag.

In one embodiment, which may be combined with one or more of the before-mentioned embodiments, the physical or environmental conditions include a temperature, in particular an ambient temperature.

In one embodiment, which may be combined with one or more of the before-mentioned embodiments, the physical or environmental conditions include a pressure, in particular an ambient pressure.

In one embodiment, which may be combined with one or more of the before-mentioned embodiments, the physical or environmental conditions include a humidity, in particular a relative humidity (water content) of the (ambient) air.

In one embodiment, which may be combined with one or more of the before-mentioned embodiments, the physical or environmental conditions include an acceleration.

In one embodiment, which may be combined with one or more of the before-mentioned embodiments, the sensor unit (and/or the control unit) is structured and configured for measuring the physical or environmental conditions at various times during the time span, in particular in regular intervals.

In one embodiment, which may be combined with one or more of the before-mentioned embodiments, the sensor is an electronic sensor.

In one embodiment, which may be combined with one or more of the before-mentioned embodiments, the sensor unit is an electronic sensor unit.

In one embodiment, which may be combined with one or more of the before-mentioned embodiments, the tag includes a main part including a housing, wherein the housing can in particular be a housing as described further above or below. The housing may be made, e.g., of a polymer, and it may contain the electronics unit. In particular, the housing has an opening through which a rip strip of the tag, if present, extends.

In one embodiment, which may be combined with one or more of the before-mentioned embodiments, the tag includes a main part and a rip strip, and the vial includes a vial body and a closure, either the main part is attached at or to the closure or is integrated, at least in part, in the closure, and the rip strip is attached at or to the vial body (in particular at or to an outside of the vial body);

or the main part is attached at or to the vial body (in particular at or to an outside of the vial body), and for the rip strip applies at least one of
the rip strip is attached at or to the closure;
the rip strip extents across the closure;
the rip strip covers at least a portion of the closure.

The a main part may in particular include the electronics unit and/or a housing of the tag.

This can make possible to achieve that the rip strip is unavoidably ripped when the pharmaceutical product is accessed (in a usual way). More particularly, accessing a septum or stopper of the vial, e.g., in order to puncture the same, requires a ripping of the rip strip. Thus, it can be provided that the measurement stops and the time span ends when the pharmaceutical product (or a stopper or septum of the vial) is accessed. This may constitute a security feature of the package.

For example, the main part is attached to the vial body, and the rip strip covers or extends across a portion of a crimp, which is predetermined to be removed for accessing a septum or stopper fixed by the crimp. Thus, the rip strip has to be ripped in order to access the pharmaceutical product. For this, the rip strip may be attached to the closure and/or to the vial body.

In another example, the main part is attached to the vial body, and the rip strip extends across a cap of the closure of the vial, more particularly wherein the rip strip extends along a path leading from the main part at the vial body across the cap and to the vial body again, where the rip strip is attached to the vial body. The rip strip may optionally be attached to the cap, too. Removing the cap will require ripping the rip strip, which again will result in a breaking of the electrical connection, and this may be an indication of the end of the time span. Therein, the cap may be, e.g., a tear-off cap, a flip-off cap, a snap cap, or a screw cap.

In another example, the main part is attached to the vial body, and the rip strip is attached to a cap of the closure of the vial. This may have the desired effect of ending the time span when the pharmaceutical product (or a septum or a stopper of the vial) is accessed, in particular in case the cap is a screw cap.

In another example, the main part is attached at or to the closure, and the rip strip extends out of the main part into two different directions, e.g., two opposite directions, so as to establish two ends of the rip strip. And both these two ends are attached at or to the vial body. Removing the cap will results in ripping the rip strip, which again will result in a breaking of the electrical connection, and this may be an indication of the end of the time span. Such a rip strip with two ends may also be considered two rip strips.

As will have become clear, suitably attaching of rip strip and the main part of the tag can constitute a security measure for preventing tampering with the tag. And in particular, it is possible to attach the rip strip and the main part in such a way (more particularly one to or at the vial body, the other to or at the closure) that the electrical connection of the rip strip is broken when the pharmaceutical product (or a septum or a stopper of the vial) is accessed. This may constitute a security feature.

In one embodiment, which may be combined with one or more of the before-mentioned embodiments in which the tag includes a housing, the housing is substantially made of an at least partially transparent material, e.g., a semi-transparent or dull or opaque material. This way, good visibility of the display of the tag can be achievable.

The packaged pharmaceutical product includes a package according to the invention and the pharmaceutical product, wherein the pharmaceutical product is contained in the vial.

Usually, the pharmaceutical product is contained in a vial body of the body.

The device ("tag device") includes:
a closure, in particular a cap or a seal, for use with a vial body for containing a pharmaceutical product; and
an electronic tag for obtaining information relating to the integrity of a product as assessed from an exposure of the product to physical or environmental conditions during a time span;
wherein
I) the tag is attached at or to the closure; or
II) at least a portion of the tag is integrated in the closure.

The tag may in particular include an electronics unit including:
a control unit;
a sensor unit including at least one sensor for monitoring the physical or environmental conditions;
More specifically, the electronics unit may include:
a display unit including a display for displaying data relating to the integrity referred to as status data;
a switch;
wherein the control unit is structured and configured for effecting that the display unit displays the status data in reaction to an operation of the switch.

The pharmaceutical product, the integrity of which is monitored by the tag, is the pharmaceutical product to be contained in the vial.

The tag may be a tag having properties of tags described elsewhere in the present patent application. In particular, the tag may include a housing, and the closure may be contained, at least in part, in the housing, e.g., the cap of the vial or a part thereof or the seal of the vial or a part thereof may be contained in the housing.

The tag device according to the invention may be a portion of the package according to the invention. Accordingly, it may be referred to the description of the package for further details and properties of the constituents of the tag device. For example, the tag may have a rip strip; a housing of the tag may provide a holder or fixture for a battery of the tag; and so on.

The device ("closure device") includes a closure, in particular a cap or a seal, for use with a vial body for containing a pharmaceutical product, wherein the closure establishes a housing. I.e. the closure or more specifically the cap or the seal at least partially encloses a hollow. In particular, the housing may be suitable for uptake of a part insertable into the housing and into the hollow, respectively. That hollow and thus the housing can in particular be suitable for receiving at least a portion of an electronic tag for obtaining information relating to the integrity of a product as assessed from an exposure of the product to physical or environmental conditions during a time span; in particular, the housing is suitable for receiving at least a portion of an electronics unit of the electronic tag, more particularly wherein the portion of an electronics unit includes a battery. The housing and the tag may each have properties as described for housings and tags, respectively, described elsewhere in the present patent application. In particular, the housing may include a first and a second housing portion (in particular interconnected by a folding portion of the housing), wherein the first and a second housing portions are foldable so as to provide a hollow inside of which space is provided which is suitable for uptake of the portion of the electronic tag.

The method for monitoring an integrity of a pharmaceutical product includes the steps of:
a) providing a vial;
b) providing
I) an electronic tag attached at or to a constituent of the vial; or
II) an electronic tag at least a portion of which is integrated in a constituent of the vial;
the vial including a vial body, the vial body containing the pharmaceutical product; the tag being a tag for obtaining information relating to the integrity of the product as assessed from an exposure of the product to physical or environmental conditions during a time span, the tag including an electronics unit including:
a control unit;
a sensor unit including at least one sensor for monitoring the physical or environmental conditions;
a display unit including a display for displaying data relating to the integrity referred to as status data;
a switch;
wherein the control unit is structured and configured for effecting that the display unit displays the status data in reaction to an operation of the switch.

The tag and the vial may have properties as described elsewhere in the present patent application for tags and vials, respectively.

The method may furthermore include the step of:
c) starting the time span.

Step c) may be accomplished, e.g., by breaking a breakable electrical connection of the tag such as the one described for the rip strip the tag may include. In this case, step c) may be caused by ripping the rip strip of the tag.

The method may furthermore include programming prescribed limitations as has been described above, e.g., by applying signals to the control unit, e.g., via at least two contact pads which may in particular be provided by a rip strip of the tag.

Provided the tag includes a rip strip, the method may also include the step of ripping the rip strip. The ripping of the rip strip may be accomplished for terminating the integrity monitoring (and ending the time span).

The method may furthermore include the step of operating the switch. The operating the switch may be accomplished for requesting a displaying of the status data.

The method may furthermore include the step of:
by means of the sensor, creating data or signals representative of the physical or environmental conditions at various times during the time span.

The method may furthermore include the step of inserting the pharmaceutical product into the vial, more particularly into a vial body of the vial.

Provided the vial includes a cap or a seal, the method may include the step of:
d) attaching (or fixing) the tag to or at the cap or the seal. This can in particular be the case in configuration I).

Step d) may be accomplished by closing a housing of the tag. The housing may have properties of a housing as described elsewhere in the present patent application. For example, step d) may be accomplished by folding two portions of the housing, such as by closing a snap fit between two housing halves.

Alternatively, step d) may include interconnecting the tag and the cap or the seal by and via a double-sided adhesive tape or by some other bonding agent.

The method for manufacturing a package for a pharmaceutical product includes the steps of:
A) providing at least one constituent of a vial for containing the pharmaceutical product, in particular at least one of a vial body, a closure, a seal, a cap;
B) providing an electronic tag for obtaining information relating to the integrity of the product as assessed from an exposure of the product to physical or environmental conditions during a time span;
wherein the method further includes the step of:
CI) attaching the tag to or at the at least one constituent of the vial; or the step of
CII) integrating at least a portion of the tag in the constituent of the vial.

The tag may be a tag having properties as described for a tag described elsewhere in the present patent application. And the same applies to the vial and to the constituent of the vial.

The method may in particular include the step of manufacturing a unitary or an integrally formed part which establishes a constituent of the vial and a housing for at least a part of the tag. More particularly, the unitary or integrally formed part may establish a housing for at least a part of the tag, e.g., for at least a portion of an electronics unit of the tag, and also a closure of the vial or a part thereof, more specifically a cap and/or a seal of the vial. The housing may be openable, e.g., including a first and a second housing portion as described above, and the method may include the step of inserting the part of the tag into the housing. Furthermore, the step of closing the housing may be carried out.

This way, an integrated tag (integrated in a vial) may be realized by producing the unitary or an integrally formed part and inserting the tag (or a portion thereof) in the housing established by that part and closing the unitary or integrally formed part. Compared to manufacturing a conventional package or vial, mainly those two steps of inserting and closing add up, besides the costs for producing the tag (or rather for an electronics unit of the tag). A mold for molding the unitary or integrally formed part will usually be more complicated than in case of a mold merely for a conventional vial. A single injection-molded part may constitute as the unitary or integrally formed part, e.g., the tag housing and the closure of the vial or a part thereof, such as a cap and/or a seal.

Provided the vial includes a closure including a cap, the method may include the step of:
E) inserting at least a portion of the tag, e.g., the electronics unit, into a housing established by the cap.

Provided the vial includes a closure including a seal, in particular a stopper, the method may include the step of:
E') inserting at least a portion of the tag, e.g., the electronics unit, into a housing established by the seal, more particularly by the stopper.

Provided the vial includes a main part and a rip strip, the method may include the steps of:
attaching the main part to or at the constituent of the vial; and
attaching the rip strip to or at another constituent of the vial.

The main part my include a housing of the tag and/or the electronics unit.

In particular, the main part may be attached to or at a vial body and the rip strip to or at a closure (in particular to a cap or to a stopper or to a crimp); or, vice versa, the rip strip may be attached to or at a vial body (in particular to the outside thereof) and the main part to or at a closure (in particular to a cap or to a stopper or to a crimp). This may be a security feature of the tag inhibiting tampering with the tag.

The method for manufacturing a device ("closure device") for use in or with a vial for containing a pharmaceutical product includes the step of:
K) providing a closure or a part of a closure which establishes a housing.

The closure may in particular include one or more of a cap and a seal and a crimp.

More specifically, the closure or the part thereof may at least partially enclose a hollow, more particularly a hollow for uptake of a part insertable into the hollow.

In particular, the housing is suitable for receiving at least a portion of an electronic tag for obtaining information relating to the integrity of a product as assessed from an exposure of the product to physical or environmental conditions during a time span.

Furthermore, the closure or the part thereof (such as the cap or the seal, or a part thereof) may be an integrally formed part such as a molded part, e.g., an injection molded part.

The method may, accordingly, include the step of:
L) manufacturing the closure or the part of a closure using a molding technique.

The housing may have properties as described for a housing described elsewhere in the present patent application.

The method for manufacturing a device ("tag device") for use with a vial for containing a pharmaceutical product comprises, in a first configuration, the steps of:
QI) providing a closure for a vial or a part of a closure for a vial, such as a cap or a seal;
RI) attaching an electronic tag to the closure or part of a closure; or
or, in a second configuration, the steps of
QII) providing a closure for a vial or a part of a closure for a vial which establishes a housing;
RII) inserting into the housing at least a portion of an electronic tag.

In particular, the tag can be an electronic tag for obtaining information relating to the integrity of the pharmaceutical product as assessed from an exposure of the product to physical or environmental conditions during a time span.

The housing, the tag, the vial and the closure for a vial or the part of a closure for a vial (e.g., the cap and/or the seal) may have properties as described for the respective items elsewhere in the present patent application. For example, step RI) may be accomplished using a double-sided adhesive tape. And the housing may be foldable. And the housing may have two housing portions establishing a snap fit. And the housing may establish a holder for a battery (of the tag).

The method may furthermore include the step of:
S) closing the housing (with at least the portion of the tag inside the housing).

The method may also include the step of:
T) clamping a battery of the tag inside the housing.

The method may, in the second configuration also include the step of
L) manufacturing the closure or part of a closure using a molding technique.

In a particular view of the invention, some properties of the tag are optional (but may, however, be nevertheless be provided), and at least a portion of the tag is integrated in a constituent of the vial, more particularly in a closure of the vial. In this case, the package for a pharmaceutical product includes:
a vial;
an electronic tag for obtaining information relating to the integrity of the product as assessed from an exposure of the product to physical or environmental conditions during a time span;
wherein at least a portion of the tag is integrated in a constituent of the vial.

The tag may, more particularly, include an electronics unit including:
a control unit;
a sensor unit including at least one sensor for monitoring the physical or environmental conditions.
And it may, as another option, also include:
a display unit including a display for displaying data relating to the integrity referred to as status data; and
a switch;
wherein the control unit is structured and configured for effecting that the display unit displays the status data in reaction to an operation of the switch.

Generally, further options and embodiments concerning this particular view of the invention can be derived from the description above and below. This concerns also the methods (monitoring methods, manufacturing methods) and the packaged pharmaceutical product and other devices. In particular, the integration of at least a part of the tag in a constituent of the vial (such as in a closure, a cap, a seal) may mean that a housing of the tag establishes a constituent of the closure of the vial and in particular of a cap of the vial or of a seal of the vial.

In still a further view of the invention, which can be considered a generalized version of the invention, one or both of the following features are merely optional:
the sensor unit; and
the switch.

With no sensor unit being provided, the tag is no more an electronic tag for obtaining information relating to the integrity of the product as assessed from an exposure of the product to physical or environmental conditions during a time span, but it is an electronic tag for obtaining information relating to the integrity of the product as assessed from an expiration date, namely in particular the expiration date of a pharmaceutical product present in the vial (more particularly in a vial body of the vial). More briefly, the tag can be considered an electronic tag for deriving information about an expiration date. Such a tag can also be considered a timer tag.

An expiration date is a point in time after which the related product (perishable product; presently more concretely the pharmaceutical product) must be expected to be possibly perished and should thus not be used anymore.

More concretely, the tag may determine a time, wherein the time is the time remaining until the expiration date is reached, or the time is the time portion of the expiration period which already has expired. In other words, in the first case, the time is the time remaining up to the end of the expiration period, more particularly up to the end of the expiration period of the pharmaceutical product present in the vial (more particularly in a vial body of the vial); and in the second case, the time is the time having elapsed since the beginning of the expiration period, e.g., since opening the vial.

For example, if the pharmaceutical product present in the vial body may be used only for 10 days after a first opening of the vial, the expiration period is 10 days. And if the vial is opened today, the expiration date will be the day which is 10 days in the future. The tag can determine (and usually will also display) either how much time (how many days, hours) is remaining until the end of the expiration period (first case) and/or how much time has expired since the opening of the vial (second case). In the above example, on the day after tomorrow, the tag will have determined (and usually also will display) 8 days in the first case, and will have determined (and usually also will display) 2 days in the second case. At least in the second case, it will usually be indicated (at the vial or in information provided with the vial) how long the expiration period is.

Accordingly, in the generalized version of the invention with no sensor unit provided, the package can be characterized as follows:

A package for a pharmaceutical product, the package including:
a vial;
an electronic tag for deriving information about an expiration date;
wherein
I') the tag is attached at or to a constituent of the vial; or
II') at least a portion of the tag is integrated in a constituent of the vial;
and wherein the tag includes an electronics unit including:
a control unit;
a timer unit for measuring a time, more particularly for determining a time having elapsed;

a display unit including a display for displaying data relating to the measured time; more particularly for displaying the measured time itself, or for displaying a remaining time resulting as a difference between a preset duration (namely usually the expiration period of the pharmaceutical product) and the measured time.

And optionally, the electronics unit may include a switch, wherein the control unit is structured and configured for effecting that the display unit displays the data relating to the measured time in reaction to an operation of the switch.

In particular, the data relating to the measured time displayed by the display correspond to the elsewhere mentioned status data (data relating to the integrity of the pharmaceutical product), as is readily understood, since the expiration period and the expiration date are closely related to the integrity of the product.

And, the time span mentioned elsewhere in the present patent application corresponds to the time span beginning with the start of the time measurement by the timer unit and has a duration corresponding to the preset time duration usually corresponding to the expiration period of the pharmaceutical product. Of course, it may optionally be provided that the time measurement continues even after the expiration date (i.e. after the expiration period has elapsed), so as to obtain (and possibly also display) by how much time the expiration period is already exceeded (in particular in the above-mentioned first case), or for being able to continue displaying how much time has expired after the expiration period has started (in particular in the above-mentioned second case).

The start of the time measurement by the timer unit usually is related to an initial event (to which the expiration period is related) such as the (usually first) opening of the vial. Although the point in time at which the time measurement starts may be determined in various ways and in particular in rather direct ways, we want to more concretely describe somewhat indirect ways of doing so, namely ways involving a rip strip and ways involving a separating element. Both, rip strip and separating element, are described in more detail elsewhere in the present patent application. In the presently described generalized version of the invention, the rip strip and the separating element (or pull-out tab), respectively, are acted on in order to start the time measurement.

For example, (voluntarily or unavoidably) ripping the rip strip when (firstly) accessing the inside of the vial (and the pharmaceutical product, respectively) or opening the vial is detected by the control unit, and in reaction thereto, the control unit will cause the timer unit to start the time measurement.

Or in another example, (voluntarily or unavoidably) pulling out the pull-out tab when (firstly) accessing the inside of the vial (and the pharmaceutical product, respectively) or opening the vial is detected by the control unit, e.g., by effecting that components of the electronics unit are electrically powered, and in reaction thereto, the control unit will cause the timer unit to start the time measurement.

Thus, the control unit may in particular be structured and configured for starting the time measurement and/or for detecting that the initial event takes place or has taken place. More particularly, the control unit may in particular be structured and configured for detecting that the initial event takes place or has taken place and for controlling the timer unit, in response thereto, for effecting that the timer unit starts the time measurement.

If in the generalized version of the invention the before-described switch is not provided, the display unit typically will either periodically or continuously display the data relating to the measured time. In this case, the display may be, e.g., a liquid crystal display or another graphical display. For example, the number of remaining hours and/or remaining days up to the end of the expiration period may be displayed.

In the generalized version of the invention, the tag (or at least the main part thereof) may in particular be attached to the vial body and more particularly to a bottom wall of the vial body.

Generally, further options and embodiments concerning this general version of the invention can be derived from the description above and below. This concerns also the methods (monitoring methods, manufacturing methods) and the packaged pharmaceutical product and other devices.

For example, the manufacturing method may be a method for manufacturing a package for a pharmaceutical product, wherein the method includes the steps of:
A') providing at least one constituent of a vial for containing the pharmaceutical product, in particular at least one of a vial body, a closure, a seal, a cap;
B') providing an electronic tag for deriving information about an expiration date; wherein the method further includes the step of:
CI') attaching the tag to or at the at least one constituent of the vial;
or the step of:
CII') integrating at least a portion of the tag in the constituent of the vial.

And, the monitoring method may, e.g., be a method for monitoring an integrity of a pharmaceutical product, wherein the method includes the steps of:
a') providing a vial;
b') providing
I') an electronic tag attached at or to a constituent of the vial; or
II') an electronic tag at least a portion of which is integrated in a constituent of the vial;
the vial including a vial body, the vial body containing the pharmaceutical product; the tag being a tag for deriving information about an expiration date, the tag including an electronics unit including:
a control unit;
a timer unit for measuring a time, more particularly for determining a time having elapsed;
a display unit including a display for displaying data relating to the measured time; more particularly for displaying the measured time itself, or for displaying a remaining time resulting as a difference between a preset duration (namely usually the expiration period of the pharmaceutical product) and the measured time.

It is readily understood that features mentioned with respect to a certain portion of the invention, e.g., for a manufacturing method or for a device, can be provided—at least in analogy and as far as logically meaningful—in other portions of the invention, e.g., in a package or in a monitoring method. The achievable effects usually correspond to each other.

The advantages of the methods basically correspond to the advantages of corresponding apparatuses and vice versa.

Further embodiments and advantages emerge from the dependent claims and the figures.

BRIEF DESCRIPTION OF THE DRAWINGS

Below, the invention is described in more detail by means of examples and the included drawings. The figures show schematically:

FIG. 1 a top view onto an electronic tag;

FIG. 2 a cross-sectional view of an attached electronic tag;

FIG. 3 a cross-sectional view of an attached electronic tag;

FIG. 4 a symbolic cross-sectional view of a package;

FIG. 5 an illustration of sequences of light pulses emittable by an electronic tag;

FIG. 9 a strongly schematized cross-sectional illustration of a package wherein a tag is attached at a crimp by containing the crimp;

FIG. 25 a strongly schematized cross-sectional illustration of a package, wherein a tag 1 is attached at a vial body, more particularly at a bottom wall of the vial body;

FIG. 26 a strongly schematized cross-sectional illustration of a package, wherein a tag is used which is a tag using printed electronics.

FIG. 27 a strongly schematized illustration of a detail of an electronic tag with pull-out tab in an initial position, in a side view;

FIG. 28 a strongly schematized illustration of the detail of an electronic tag of FIG. 27, with pulled-out pull-out tab, in a side view.

Figure 6:
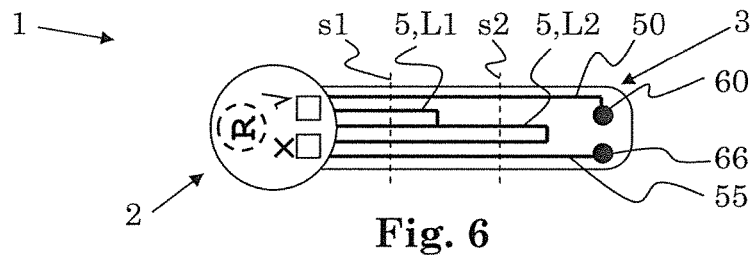
FIG. 6 a top view onto an electronic tag.

The described embodiments are meant as examples and shall not limit the invention.

DETAILED DESCRIPTION OF THE INVENTION

FIG. 1 shows a schematized top view onto an electronic tag 1. Tag 1 includes a temperature sensor or a sensor for some other physical or environmental condition. The tag can monitor that magnitude and decide whether or not certain (prescribed) conditions concerning that magnitude are met, e.g., whether or not a threshold value has been exceeded and possibly also for how long it has been exceeded. Depending on the monitored (sensed or measured) values (of temperature, pressure, humidity, acceleration or others and usually also of the time), one or more types of alarm indications can be provided by the tag, depending on the type of event or failure that occurred. Since such functionalities are known from prior art, we will not go into much detail here concerning this point.

Tag 1 of FIG. 1 includes a main part 2 and a rip strip 3, which are mutually interconnected. The main part 2 typically has a volume of at most 35 mm×30 mm×12 mm, in particular having a side length of, at most, the specified lengths, and more particularly, it may have a volume of at most 25 mm×20 mm×10 mm, and in particular a side length of, at most, the specified lengths.

The main part 2 includes an electronics unit including, among other things, a user-operable switch 9 (cf. the dotted hand symbol in FIG. 1) and a display 6 substantially consisting of two light emitters 7, 8 such as two LEDs, in particular a red LED and a green LED. The rip strip 3 substantially consists of a printed circuit board (PCB) or of a piece or part thereof and more particularly of PCB base material 4 in and/or on which conductor lines 5 are present. It is particularly suitable to provide, as the rip strip 3, an electrically insulating foil 4 such as a polymer foil provided with conductor lines 5.

In fact, the electronics unit (having reference symbol 40 in further figures) and the rip strip 3 may be considered to share one printed circuit board. And the electronics unit 40 may be considered to be a printed circuit board assembly (PCB assembly or PCBA), i.e. a PCB with components mounted thereon (the components being described above and also below), wherein the PCB forming the rip strip 3 is continuous with the PCB of the PCBA representing the electronics unit 40.

FIG. 2 shows a schematic cross-sectional view of an attached electronic tag 1, and at the same time, FIG. 2 may be interpreted to show a schematized detail of a package 10 including a vial (the vial bearing reference numeral 80 in further figures). The tag 1 of FIG. 2 may be identical with the one of FIG. 1.

Tag 1 includes electronics unit 40 in its main part 2 and rip strip 3, each including a portion of one and the same PCB, which may be a flexible PCB.

Tag 1 and, more particularly, main part 2 includes a housing 41 in which electronics unit 40 is present. Electronics unit 40 includes, besides the PCB and mounted thereon, an energy source such as a battery 42, the above-mentioned switch 9, which may be, e.g., an electro-mechanical switch or a capacitive switch, the light emitters of the display (only LED 7 being illustrated in FIG. 2) and an integrated circuit (IC) 44 such as an ASIC (application-specific IC). IC 44 may embody a control unit and a sensor unit, but it is also possible that a separate sensor unit is mounted on the PCB.

It is possible that data sensed by a sensor of the sensing unit are continuously (or quasi-continuously) taken, but usually, measuring or sensing takes place in time intervals of between 30 seconds and 12 hours, more particularly between 1 minute and 30 minutes, so as to save energy.

Housing 41 may be made substantially of a material which is sufficiently transparent for letting light emitted by light emitters 7, 8 of tag 1 pass through such that it is visible from the outside, or may comprise, as indicated in FIG. 2, a transparent or (particularly) thin portion 49 for that purpose.

In order to attach tag 1 to a tag carrier 11 such as a constituent of a vial, e.g., a cap, a double-faced adhesive tape 15 may be used. An alternative would be to use a different bonding technique such as the application of an initially liquid bonding material such as a glue. A bonding may take place between the housing 41 and the tag carrier 11, and it is possible, as indicated in FIG. 2, to provide that it takes place, in addition, between the battery 42 and the tag carrier 11. In the latter case, the adhesive tape 15 or other bonding material may function as a part of the housing of the tag 1.

An alternative way of attaching tag 1 to a tag carrier 11 is illustrated in FIG. 3. In the embodiment of FIG. 3, the tag may be identical with the one of FIG. 1, and its electronics unit 40 may be identical with the one of FIG. 2. However, the attaching of main part 2 to tag carrier 11 is accomplished in an indirect way. More specifically: A foil 18 such as a polymer foil holds main part 2 between itself and tag carrier 11. In an area partially surrounding main part 2, foil 18 is bonded to tag carrier 11 using a bonding material such as a glue (indicated at 19 in FIG. 3, but not separately drawn). Thus, main part 2 is sandwiched between foil 18 and tag carrier 11.

Suitable tag carriers 11 are constituents of a vial to be provided with a tag, e.g., the vial body (which forms a hollow for uptake of a pharmaceutical product and often is made of glass) or a constituent of the closure of the vial such as a cap or a seal, e.g. a stopper.

A pharmaceutical product (later referenced by reference numeral 24) to be monitored by means of the tag is contained in the vial, more particularly in the vial body of the vial. The pharmaceutical product usually can be provided in liquid form, e.g., so as to be injectable using a syringe, but other pharmaceutical forms are possible, too, such as powders, granulates, pills.

FIG. 4 is a symbolic cross-sectional view of a package 10 and of a corresponding packaged pharmaceutical product 24. Pharmaceutical product 24 is contained in a vial body 82 of vial 80. Vial 80 includes vial body 82, e.g., made of glass, and a closure 85. Closure 85 is substantially a seal 86 including and rather consisting of a septum 88 and a crimp 87, e.g., an aluminum crimp. The closure could optionally also include a cap. And instead of closing the vial body by septum 88, a stopper could alternatively be used.

Vial 80 is contained in a box 12 which typically is a folding carton. Instead of such a package 10 (which could be considered a single-level package), it would also be possible to provide a two-level package 10, e.g., in which case the vial could be contained in a blister-type bag which again would be contained in box 12.

A tag 1, e.g., a tag like described elsewhere in the present patent application, e.g., in FIG. 1 or 2, is attached to vial 80 and more particularly to crimp 87 and thus to seal 86. As indicated by dotted lines, it is also possible to provide another tag 1' at a different constituent of vial 80, e.g., as illustrated, at vial body 82.

A tag 1, e.g., a tag as described above, and, more particularly, the corresponding electronics unit 40 can be structured and configured for detecting an interruption of a conductor line loop of rip strip 3, e.g., by cutting rip strip 3 using a cutting tool or by ripping rip strip 3 by hand. And, moreover, this may result in a termination of the monitoring (and of the measurements and of the sensing) being accomplished (or at least evaluated) by the tag 1.

Accordingly, it can be provided that monitoring the integrity of a product 24 is carried out from a starting event to an end point. The starting event can be, e.g., when vial 80 is packaged in an outer package (in particular into a folding box), or when vial 80 is assembled (with product 24 in vial body 82), or when product 24 is filled into vial body 82. The end point may be indicated by a ripping of rip strip 3. And this ripping can be linked to an accessing of product 24, e.g., by prescribing (to a user such as a patient or a health care specialist) that rip strip 3 has to be ripped when box 12 is opened or when the vial is about to be opened or when the pharmaceutical product is about to be used (e.g., for giving a shot in case of an injection vial). This way, it can be ensured, to some extent, that the monitoring of the integrity of product 24 is terminated when product 24 is accessed. Further below, further ways of ensuring this are described, cf., e.g., FIGS. 21-24. The integrity status of product 24 may, also in reaction to the ripping, be stored in tag 1 such that it can be recalled later (namely by operating switch 9, cf. FIGS. 1-3) and/or may be displayed by the display 6 of tag 1, e.g., by the emission of light pulses.

A beginning of the time span during which the physical or environmental conditions are monitored may be indicted by breaking another loop present on rip strip 3, cf. also FIG. 7 below. For example, dividing the rip strip of FIG. 1 along the dashed line s2 (and thus opening the longer one of the two loops present on rip strip 3) may be detected by electronics unit 40 (and more particularly by a control unit realized therein) by an increase of an ohmic resistance and make the electronics unit 40 start the monitoring. On the other hand, dividing the rip strip of FIG. 1 along the dashed line s1 (and thus opening the shorter one of the two loops present on rip strip 3; the longer one being already open) may be detected by electronics unit 40 (and more particularly by a control unit realized therein) by an increase of an ohmic resistance and make the electronics unit 40 terminate (stop) the monitoring.

Alternatively, the monitoring can be started differently, cf. below at the description of FIG. 8 ("initiating switch"). In that case, a single conductor line loop may be sufficient, and rip strip 3 may remain unripped at least until after packaging, i.e. at least up to forwarding/shipping the packaged pharmaceutical product 24. Furthermore, rip strip 3 (cf. FIG. 6) might in general be dispensed with. In that case, the tag is substantially identical with its main part.

As is clear from the above, a display 6 of a tag 1 may include (an in particular essentially consist of) one or more light emitters such as LEDs, in particular light emitters of different color, e.g., one emitting red light and another emitting green light. A control unit of tag 1, e.g., an integrated circuit, e.g., the one of FIGS. 2, 3, may control the display 6 to emit light pulses, more particularly sequences of light pulses (wherein already a single light pulse shall be considered a sequence of light pulses). Emitted light pulses in a sequence may differ in at least one of color, duration, intensity. Assuming that color is a parameter that can be varied for displaying integrity status information, generally, the emission of green light may be emitted in order to indicate that the product integrity is still in order, and the emission of red light may be emitted in order to indicate that the product integrity is not in order anymore.

Assuming that in addition, the duration (of a pulse in a sequence) is a parameters which can be varied for displaying integrity status information, it can be provided, e.g., that two or more types of alarm (or types of failures) are indicated by different pulse durations. An example will be illustrated and described by means of FIG. 5.

FIG. 5 is an illustration of sequences of light pulses emittable by an electronic tag 1 such as by an above-described tag 1. The curves "a" to "e" illustrate different sequence which may be emitted in 5 different cases, i.e. in five different integrity statuses. The horizontal axis is the time axis, the vertical axis is the light intensity axis, intensities being either zero or a maximum value.

One way of distinguishing three types of failures (one, two or three of which may have occurred and thus may have to be indicated when displaying the integrity status) works as follows:

If a failure of a first type has occurred, a single short red pulse is emitted (cf. curve a).

If a failure of a second type has occurred, a two short red pulses are emitted (cf. curve b).

If failures of both, first and second type, have occurred, a three short red pulses are emitted (cf. curve c).

If a failure of a third type has occurred, a single long red pulse is emitted (cf. curve d).

If, in addition to a failure of the third type, a failure of the first and/or a failure of the second type has occurred, the (partial) sequence for the additional failure(s) is appended to the long red light pulse indicating the third type failure. Curve e indicates the case that a failure of a first type and a failure of a third type have occurred.

A failure of first type may mean, e.g., that an upper temperature limit T(up) has been exceeded.

A failure of second type may mean, e.g., that a lower temperature limit T(low) has been fallen short of.

A failure of third type may mean, e.g., that a threshold temperature limit T(thr) has been exceeded (or fallen short of) for a too long time, more particularly for more than a prescribed threshold time t(thr).

Such a kind of data indicative of prescribed limitations of a product, e.g., T(up), T(low), T(thr) and t(thr), are usually stored in the electronics unit. They may be programmable in a way described further above in the present patent application. If programming pads are provided for programming such values, these may in particular be provided on the rip strip. FIG. 6 illustrates a possible design of a rip strip 3 with contact pads for programming such values.

FIG. 6 shows an illustration of a top view onto an electronic tag 1. This tag 1 can be largely identical with other tags described in the present patent application, such as tag 1 of FIG. 1, but the rip strip 3 is designed to provide two contact pads 60, 66. While conductor lines 5 form two loops L1, L2, which may (as illustrated) partially overlap and are readily interrupted by ripping rip strip 3 along separation lines s1, s2, conductor line 50 provides an electrical connection between pad 60 and the electronics unit of tag 1, and conductor line 55 provides an electrical connection between pad 66 and the electronics unit of tag 1. Via contact pads 60, 66, data indicative of prescribed limitations of a product to be monitored (such as the above-mentioned T(up), T(low), T(thr) and t(thr)) may be programmed before ripping rip strip 3 along s1 or s2.

In the process of packaging pharmaceutical products, a (high) number of such tags 1 may be present, and an arbitrary one of them is selected for the next product, and then—when the type of product to be packaged is known—the data indicative of prescribed limitations of that specific product for the exposure of that specific product to the monitored physical or environmental conditions are programmed (using pads 60 and 66). This way, in a single packaging line, the provision of a single type of tag 1 can be sufficient for packaging (and monitoring) in that packaging line a plurality of different products (with different prescribed limitations). Accordingly, storing various different types of tags, each specifically designed for the different products to be packaged (set to the respective specific prescribed limitations for the exposure of the product to the physical or environmental conditions), may become superfluous this way.

And starting the monitoring by opening loop L2, e.g., by cutting along line s2, will simultaneously make a reprogramming of tag 1 difficult, thus impeding tampering with the tag.

If product integrity is in order, this may be indicated by one or more green light pulses. It is, more specifically, possible to distinguish different types of (still-)in-order statuses. For example, in a first case, a single green pulse is emitted, cf., e.g., curve a or curve e. And in a second case, two green pulses are emitted, cf., e.g., curve b, or more than two pulses are emitted, or green and red pulses are emitted.

The first (still-)in-order status case may be, e.g., that no threshold value has been reached. In case a temperature is monitored, this would be the case, e.g., if the temperature never left the range at which the product may be kept virtually forever or (as more often will be the case) until its expiration date.

The second (still-)in-order status case may be, e.g., that for more than a pre-selected time duration, a threshold value has been exceeded and fallen short of, respectively, (depending on the threshold being an upper and a lower threshold value, respectively). For example, in case a temperature is monitored, this would be the case, e.g., if the temperature of the product may be above an upper threshold of, e.g., 37° C. for at most, e.g., 72 hours, and an alarm is desired as soon as only 24 hours or less are left (24 hours being the pre-selected time duration). If then the temperature has in fact been above 37° C. for already more than 48 hours, such that the product will be in order for only less than 24 hours (provided that its temperature will remain above 37° C.), the second (still-)in-order status shall be indicated.

Figure 7:
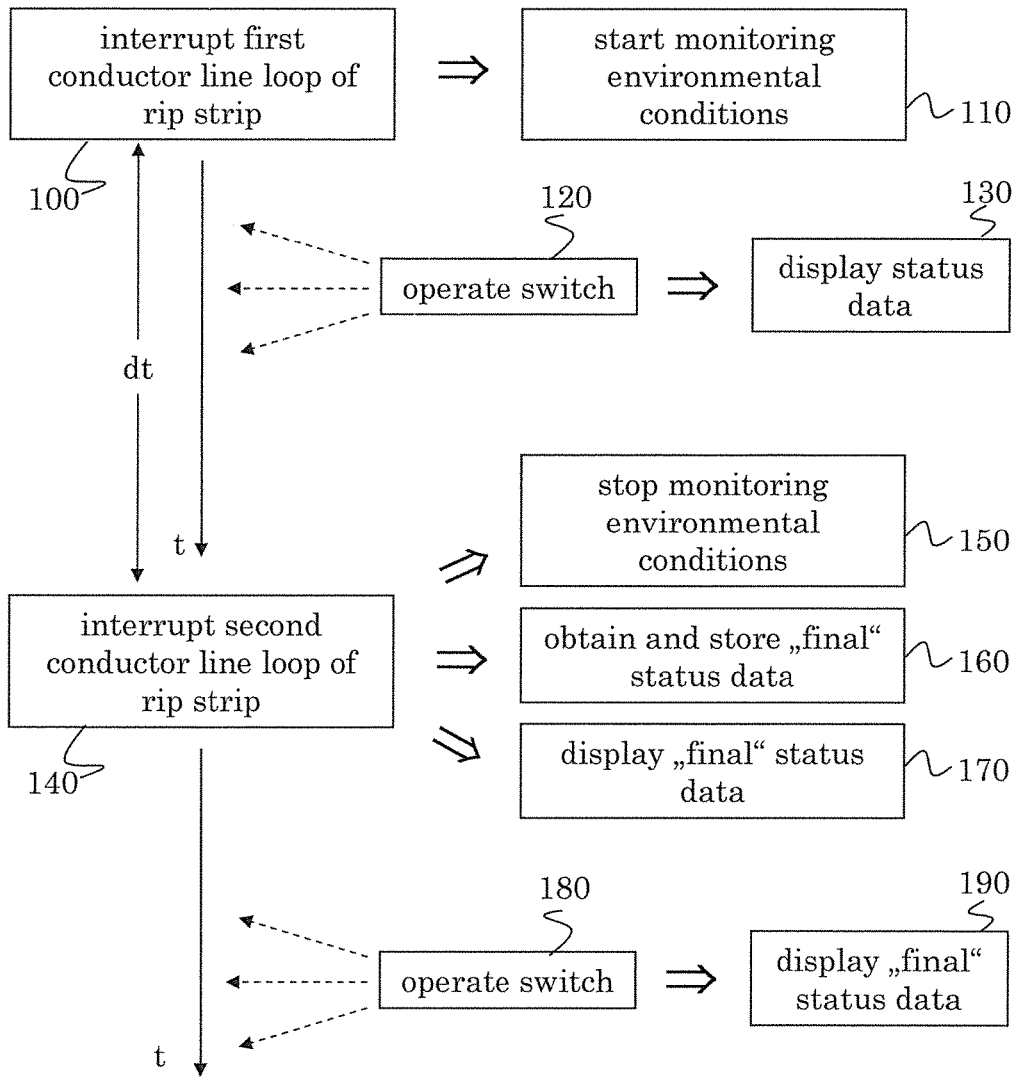
FIG. 7 an illustration of method steps.

FIG. 7 illustrates method steps. Reference symbol t denotes the time, dt denotes the time span during which monitoring takes place. In steps 100, 110, the time span during which integrity monitoring shall take place is started by interrupting a first electrical contact, e.g., by opening a conductor line loop, cf. also dashed line s2 in FIG. 1. Operating switch 9 during the subsequent time span (step 120) results in a displaying of the status data (step 130).

Interrupting another electrical contact (cf. step 140) results in terminating the time span and the monitoring (step 150), obtaining the final status data (step 160) and displaying the final status data (step 170). When later on, switch 9 is operated (step 180), the final status data are displayed (step 190).

It is to be noted that usually, the status data will not be permanently displayed, but only when the switch 9 is operated; and optionally also when the time span (and thus the monitoring) is terminated and/or optionally in (regular) time intervals (controlled by the control unit), the time intervals being usually between 1 second and 2 minutes, more particularly between 10 seconds and 1 minute.

Figure 8:
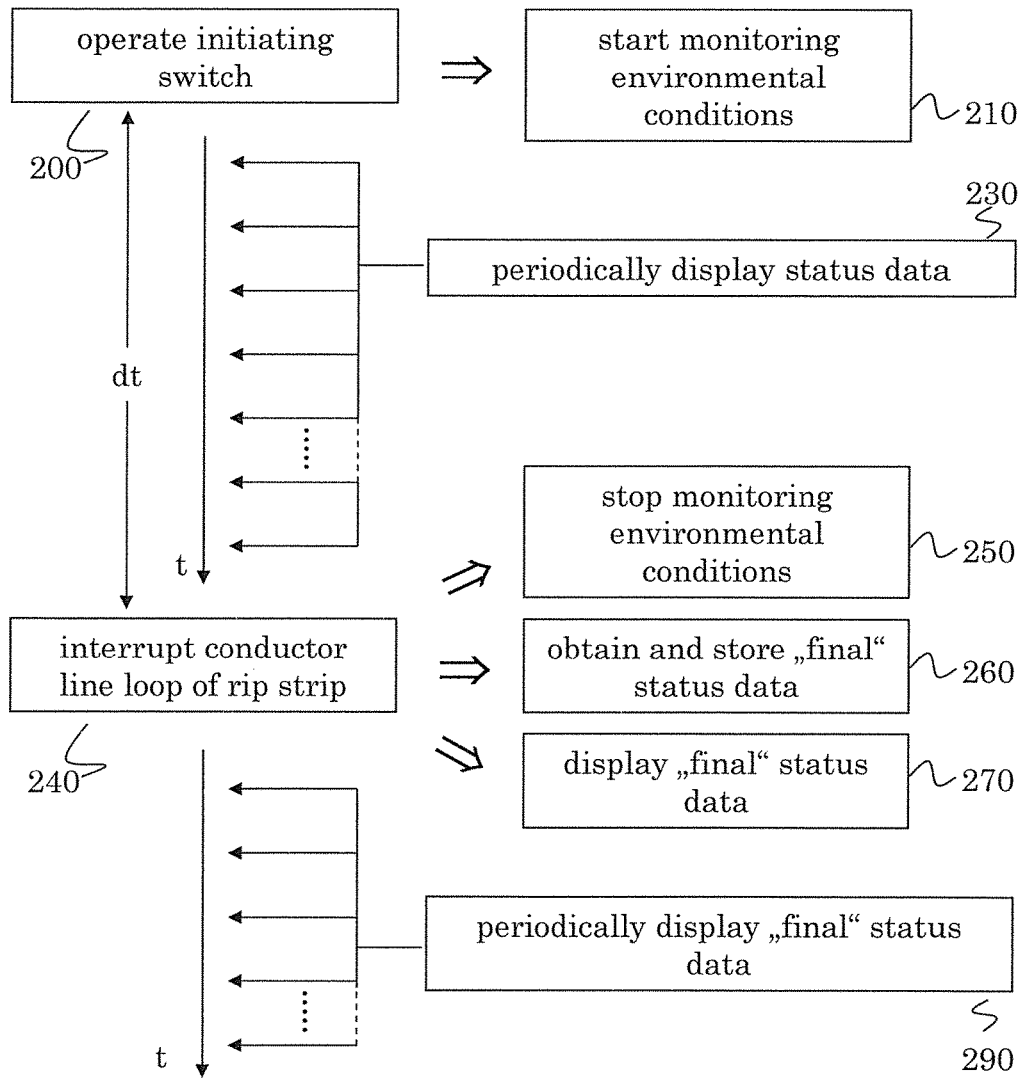
FIG. 8 an illustration of method steps.

FIG. 8 is another illustration of method steps, similar to the one of FIG. 7. It illustrates an example for the case that no switch is required for displaying the status data. Instead, the status data are displayed periodically, before and after terminating the monitoring, cf. steps 230 and 290. And FIG. 8 also illustrates an example for the case that monitoring is started without needing a rip strip for that purpose. Instead, the monitoring is started in reaction to the operation of a switch, referred to as initiating switch, cf. step 200. It can be referred to FIG. 2 for illustrating a corresponding electronic tag 1, wherein the item referenced 9 in this case is interpreted as such an initiating switch, i.e. as a switch, when operated, effecting that the monitoring starts. Such a switch may be an electro-mechanical switch, a capacitive switch, a magnetic switch or an inductive switch. Note that it is possible to nevertheless provide in this case a rip strip—in particular for the purpose of terminating the monitoring. But alternatives thereto are possible, e.g., a switch (e.g., the before-mentioned initiating switch) may be provided for that purpose.

Otherwise, the method and the corresponding package and tag may be as described elsewhere in the present patent application.

Note that the initiating switch may in particular be a magnetic or inductive switch. For example, the manufacturing of the retail package or retail unit may include moving the same along a path along which a suitable magnet (permanent or electromagnet) and a suitable coil, respectively, is suitably positioned, e.g., along a path described by a conveyor transporting the package or the packaged pharmaceutical product. Then, while passing along the respective magnetic or electric field, the initiating switch is operated (without having to mechanically contact the tag), and the monitoring starts. However, the initiating switch might also be an electro-mechanical or a capacitive switch, the latter one also allowing a contact-free operation.

Of course, it is also possible to provide in the embodiment of FIG. 8 the before-described switch by means of which a displaying of the status data can be initiated (display switch). This switch (sufficiently described above) may be identical with the initiating switch or be an additional switch. In case the switches are identical, it may be provided that different effects may be provoked by differently operating the switch. For example, a brief operation of the switch (e.g., for at most 1.5 seconds) provokes a displaying of the status data, whereas a longer operation (e.g., for at least 3 seconds) can effect that the monitoring starts. Moreover, the function of the rip strip (for terminating the monitoring) may also be assumed by the switch, e.g., termination of monitoring is in that case effected in reaction to operating the switch for an even longer time (e.g., for at least 8 seconds). In this case, the rip strip may be dispensed with.

Instead of bonding the tag 1 to a part of the vial 80 as described above, cf., e.g., FIGS. 2 and 3, tag 1 can be attached thereto in a different manner or even be integrated, at least in part, therein. In the examples of FIGS. 9 to 19 and 21, we basically refer to a cap (which is a constituent of a closure of the vial) as a constituent of the vial to or at which the tag 1 is attached or in which a part of the tag, such as in particular a housing of the tag, is integrated. But other constituents of the vial may also be used for attaching or integrating the tag, e.g., cf. below or cf. FIG. 4.

FIG. 9 illustrates in a strongly schematized manner a package 10 wherein a tag 1 is attached at a seal 86 and more particularly to a crimp 87 by containing the same. The tag 1 can be a tag as described elsewhere in the present patent application, e.g., in FIG. 1 or 2. If a rip strip is provided in a tag, the rip strip will usually not be housed by a housing 41. The housing 41, symbolized by thick lines, has an opening through or into which a portion of vial body 82 extends. Housing 41 and seal 86 may, e.g., establish a snap fit.

PCB 34 of tag 1 is present between battery 42 and the electronic components of tag 1.

In order to be able to insert electronics unit 40 into housing 41, the latter may be dividable into two (or possibly more) parts, e.g., along the dotted line in FIG. 9. With the two housing halves separate, electronics unit 40 can be inserted into housing 41, and then, housing 41 can be closed, which in addition attaches tag 1 to seal 86.

Figure 10:
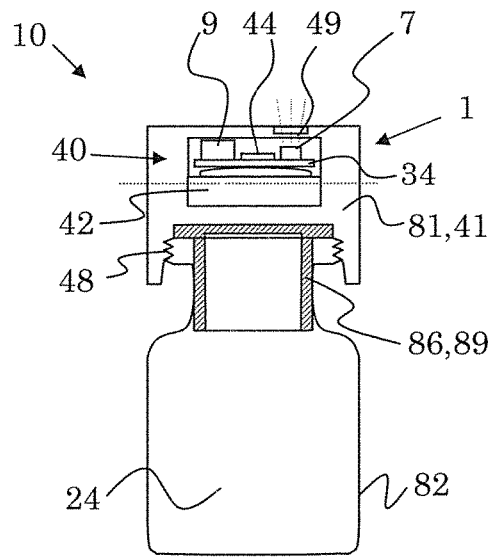
FIG. 10 a strongly schematized cross-sectional illustration of a package including a tag integrated in a cap.

FIG. 10 is a strongly schematized illustration of a package 10 (or rather of a packaged pharmaceutical product 24) including a tag 1 integrated in a cap 81, wherein as an example, the cap is illustrated as a screw cap having a threading 48. Due to the integration, cap 81 not only protects and fixes a stopper 89 forming a seal 86, but also constitutes a housing 41 for at least a portion of tag 1, in particular for electronics unit 40. If a rip strip is provided in a tag, the rip strip will usually not be housed by a housing 41. An integrated member as illustrated in FIG. 10 fulfills the functions of both, being the cap 81 of the closure of the vial 80, and being a housing 41 for at least a portion of an electronic tag 1.

The housing 41 of FIG. 10 may be dividable into two (or possibly more) parts, e.g., along the dotted line in FIG. 10, e.g., as described in conjunction with FIG. 9.

The housing in FIG. 9 and also the housing 41 in FIG. 10 may be integrally formed, e.g., being a single molded part.

Figure 11:
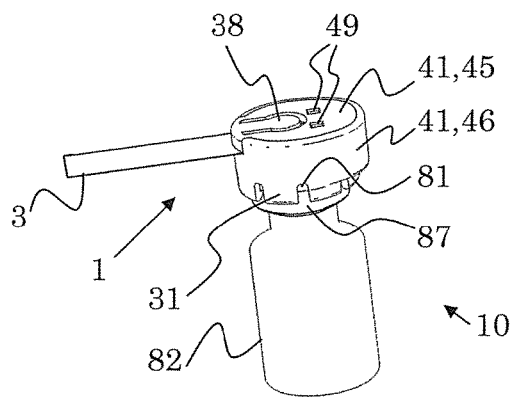
FIG. 11 a perspective view of a package wherein a tag is attached at a cap by containing the cap.
Figure 12:
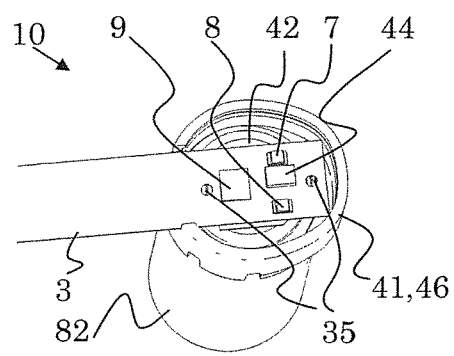
FIG. 12 a perspective view of the package of FIG. 11, with a part of the housing of the tag removed.
Figure 13:
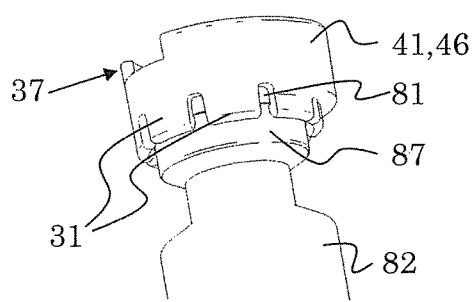
FIG. 13 a perspective view of the package of FIG. 11, with a part of the tag removed.
Figure 14:
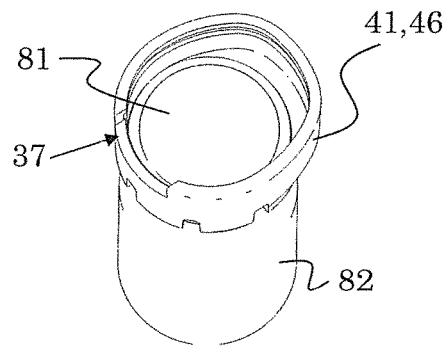
FIG. 14 a perspective view of the package of FIG. 11, with a part of the tag removed.

FIGS. 11 to 14 are perspective views of a package 10 wherein a tag 1 is attached to a closure and, more particularly, to a cap 81 of the vial 80 by containing the cap 81, wherein in FIGS. 12 to 14, a part of the tag is removed. The tag 1 can be a tag as described elsewhere in the present patent application, e.g., in FIG. 1 or 2.

The tag 1 has a housing 41 having arms 31, which establish a snap fit with the cap 81. Housing 41 has two portions 45, 46 which are mutually fixed, e.g., by establishing a snap fit. Housing portion 45 provides a flexible portion 38. which is defined by a slit in housing 41. A switch of an electronics unit present inside housing 41 can be more easily approached this way. Pushing the flexible portion 38 from outside housing 41 can make possible to readily operate a switch positioned below the flexible portion 38.

Housing portion 45 provides two transparent portions 49, which, in particular, may be transparent by having a reduced thickness, but which may be windows or openings. LEDs of a display unit of the electronics unit present inside housing 41 are better visible this way.

Tag 1 includes a main portion including housing 41 housing the electronics unit of tag 1, and optionally a rip strip 3, as illustrated.

The vial includes a vial body 82 sealed by means of a crimp 87 and either a septum or a stopper. Crimp 87 is protected by cap 81.

In FIGS. 12 to 14, package 10 is drawn with housing portion 45 removed.

As visible in FIG. 12, tag 1 includes a battery 42, which is electrically and mechanically connected by contacts 35 to the PCB, which also forms rip strip 3.

In FIGS. 13 and 14, package 10 is drawn with housing portion 45 and electronics unit including rip strip 3 removed. Housing 41 has an opening 37 through which rip strip 3 can extend.

Figure 15:
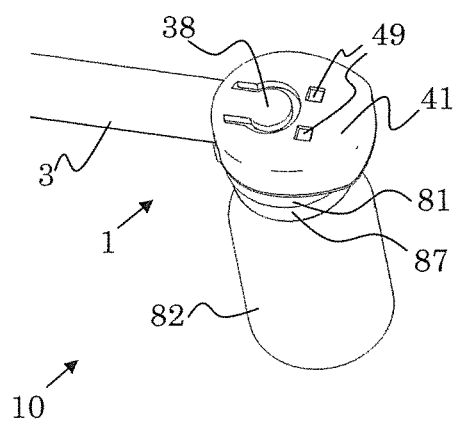
FIG. 15 a perspective view of a package wherein a tag is attached to a cap by bonding.
Figure 16:
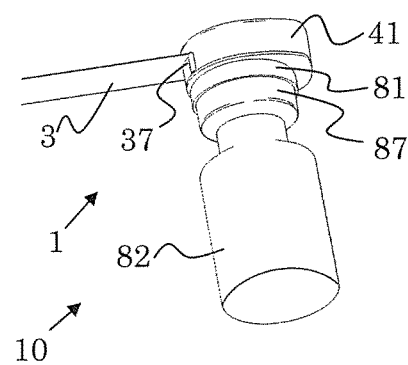
FIG. 16 a perspective view of the package of FIG. 15.

FIGS. 15 and 16 are perspective views of a package 10 wherein a tag 1 is attached to a cap 81 by bonding. For the bonding, e.g., a double-faced adhesive tape or a glue may be applied. As is generally the case, also here, identical reference symbols refer to corresponding parts.

Figure 17:
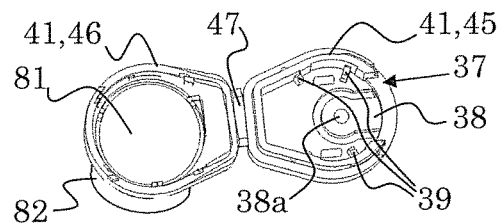
FIG. 17 a perspective view of an integrally formed housing attached to a cap by including the cap.

FIG. 17 is a perspective view of an integrally formed housing 41 attached to a closure and more particularly to a cap 81 of a vial by including the cap 81, e.g., establishing a snap fit, as illustrated in FIG. 11.

The housing 41 can be, e.g. a single molded part. It includes two main housing portions 45, 46 and a folding portion 47 interconnecting these. Like described already in conjunction with FIGS. 11 to 14, an opening 37 may be provided by housing 41, in particular in case the tag includes a rip strip, and a flexible portion 38 may be provided by housing portion 45 for improving access to a switch of the tag. Such a flexible portion 38 may provide a protrusion 38a for an improved accessing of such a switch.

Figure 18:
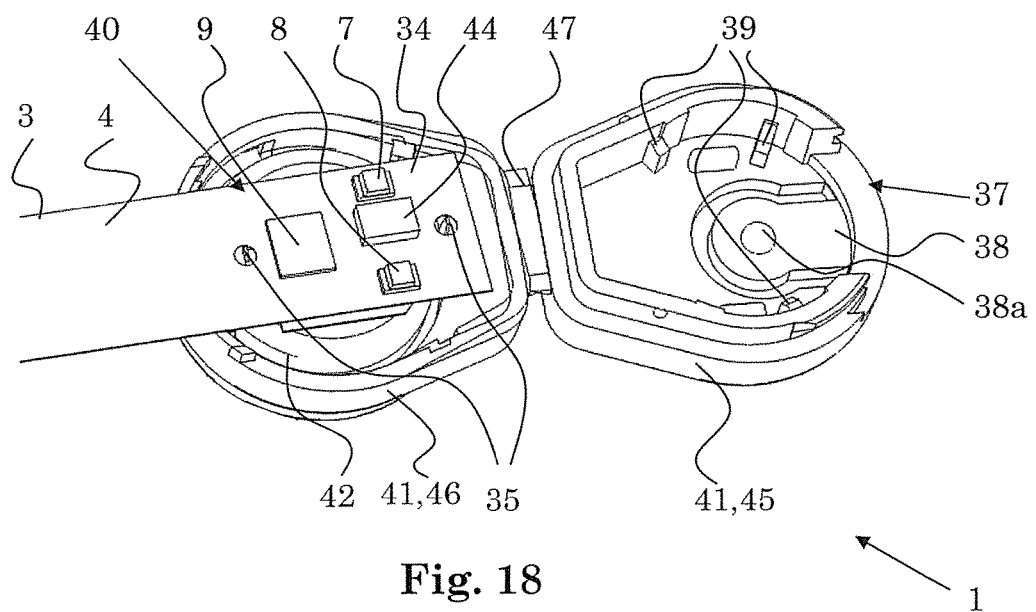
FIG. 18 a perspective view of a tag including an integrally formed housing.

Furthermore, housing 41 provides a holder or fixture for a constituent of the tag, in particular for a battery of the tag, cf., e.g., battery 42 in FIG. 18, 19 or also FIG. 12. For establishing this, e.g., protrusions 39 like illustrated in FIG. 16, e.g., ribs, may be provided. Such protrusion 39 may in particular be provided in portion 45. This can simplify assembling the tag and the package.

FIG. 18 is a perspective view of a tag 1 including an integrally formed housing 41, wherein the housing is open. The housing 41 in FIG. 18 may be identical to the housing 41 of FIG. 17.

Electronics unit 40 and its constituents are well visible in FIG. 18. Battery 42 is connected to PCB 34 via two contacts 35. Battery contact leads may be bonded to battery 42, which lead to the contacts 35. PCB 34 can be, as illustrated in FIG. 18, continuous with rip strip 3. At flexible portion 38, a protrusion 38a may be provided which facilitates operating switch 9 (with housing 41 closed).

Housing 41 is foldable. Folding portion 47 provides a flexibility or elasticity suitable for that purpose. Housing portions 45 and 46 can establish a snap fit.

Figure 19:
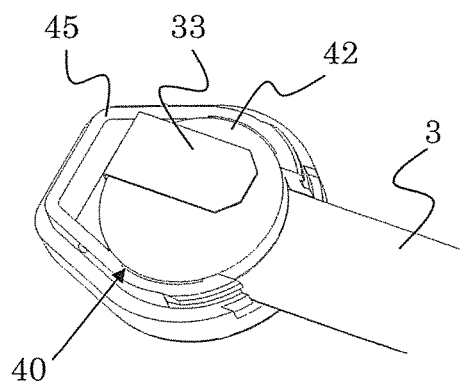
FIG. 19 a perspective view onto a portion of the housing of FIG. 18.

FIG. 19 is a perspective view onto a portion of the tag of FIG. 18. In FIG. 19, housing portion 46 is not drawn, but housing portion 45 is. The electronics unit 40 is inserted in housing portion 45. Since, in the embodiments of FIGS. 18, 19, battery clamping takes place in housing portion 45, insertion of electronics unit 40 is accomplished rather in the way suggested by in FIG. 19 than suggested by FIG. 18.

A battery contact lead 33 contacting battery 42 is visible in FIG. 19.

Embodiments like those illustrated in FIGS. 9 and 11-17 can be readily accomplished using many of today's commercially available vials, and embodiments like those illustrated in FIGS. 18 and 19 can be readily used with many of today's commercially available vials.

Figure 20:
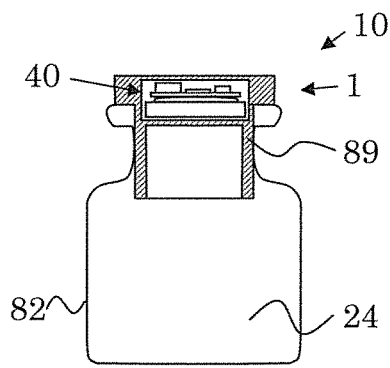
FIG. 20 a strongly schematized cross-sectional illustration of a package wherein a tag is integrated into a stopper.

FIG. 20 is a strongly schematized cross-sectional illustration of a package 10, wherein a tag 1 is integrated into a stopper 89 establishing a closure of the vial. Stopper 89 has a hollow in which an electronics unit 40 of the tag 1 is present. Stopper 89 establishes a housing of tag 1. Vice versa, one could say that the housing 41 of tag 1 establishes a portion of stopper 89 of the vial.

Whereas in most of the Figures of packages described so far, a rip strip is optional, i.e. may be present or not, independent of a rip strip being illustrated or not, in the following Figures, a rip strip 3 provides a special security feature because it can ensure that access to a pharmaceutical product 24 present inside the vial body 82 or to a stopper 89 or septum 88 of the closure 85 is (under normal circumstances) only possible by ripping the rip strip 3. The ripping may be used as an indicator for the end of the time span. Tampering with the tag 1 may be inhibited this way.

Figure 21:
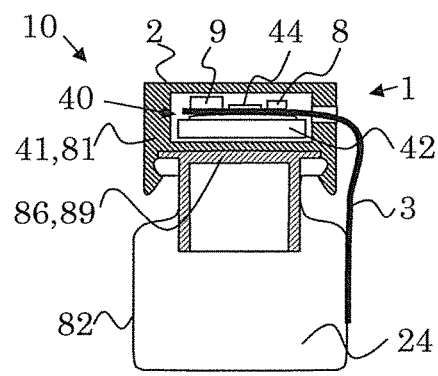
FIG. 21 a strongly schematized cross-sectional illustration of a package wherein a tag is integrated in a cap and a rip strip is attached to a vial body.

FIG. 21 is a strongly schematized cross-sectional illustration of a package 10 wherein the tag 1 is integrated in a cap 81 and the rip strip 3 is attached to the vial body 82.

Cap 81 establishes housing 41 of tag 1 and, vice versa, housing 41 of tag 1 establishes cap 81 or at least a portion thereof. The housing may be, e.g., a foldable single-piece housing 41 as described, e.g., in FIG. 18, or a housing 41 of two separate portions as described, e.g., in FIG. 11.

The rip strip 3, however, while forming a PCB of the electronics unit 40 of the tag, is also attached to vial body 82, e.g., using a bonding material or by fusing. Depending on the geometry of vial and tag, additional particular measures might have to be taken in order to ensure that the rip strip 3 is ripped when cap 81 is removed from vial body 82. One possibility is to provide a rip strip with two external ends such as illustrated in FIG. 22, or to have the rip strip attached at a neck 84 of vial body 82, e.g., like illustrated in FIG. 23, which may, e.g., be accomplished using a strap 90.

Figure 22:
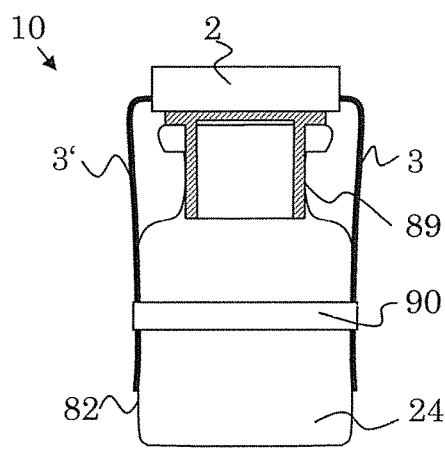
FIG. 22 a strongly schematized cross-sectional illustration of a package wherein a tag is positioned on or attached to a stopper, and a particular rip strip is attached to opposing sides of a vial body using a strap.

FIG. 22 is a strongly schematized cross-sectional illustration of a package 10 wherein a tag 1 is positioned on or attached to or at least present on a stopper 89, and a particular rip strip is attached to opposing sides of the vial body 82 using a strap 90. Tag 1 may be considered to include, besides its main portion 2, either a single rip strip 3/3' having two ends, or two rip strips 3 and 3'. In any event, two rip strip ends are attached to vial body 82 in different places, in particular to opposing faces of vial body 82. Whereas it is possible to glue the rip strip(s) to the vial body, it is also possible to provide a strap 90 and to either clamp the rip strip(s) between the strap 90 and the vial body 82 or to attach (e.g., by gluing or fusing) the rip strip(s) to the strap 90 and, optionally in addition, to attach the strap 90 to the vial body 92. The latter option may in particular be dispensed with in case the strip is provided in the region of a neck 84 of the vial body, cf., e.g., FIG. 23.

Figure 23:
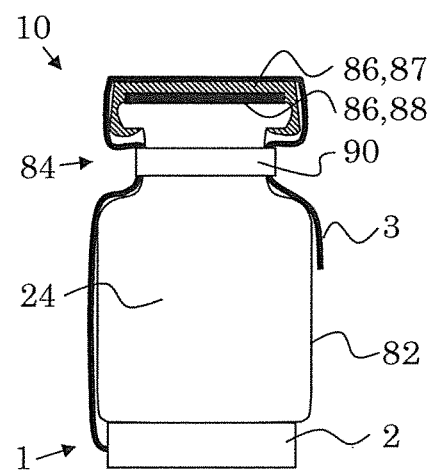
FIG. 23 a strongly schematized cross-sectional illustration of a package wherein a tag is attached to a vial body, and a rip strip is guided over a closure of the vial, and the rip strip is attached to a vial body using a strap.

FIG. 23 is a strongly schematized cross-sectional illustration of a package 10 wherein a tag 1 is attached to a vial body 82, and a rip strip 3 is guided over a closure of the vial and more particularly over a seal 86 of the vial, and the rip strip 3 is attached to a vial body 82 using a strap 90, wherein the strap 90 may, in particular and as illustrated in FIG. 23, be located in a neck region of the vial body.

The strap 90 may be, e.g., a shrink tube.

Figure 24:
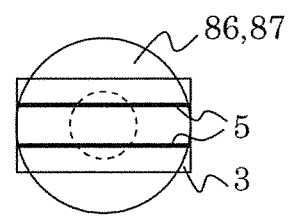
FIG. 24 a strongly schematized top-view illustration of the package of FIG. 23.

FIG. 24 is a strongly schematized top-view illustration of the package 10 of FIG. 23.

In case the seal 86 of the closure includes a crimp 87, the crimp 87 may include a (typically centrally positioned) region where either an opening is provided or a predetermined breaking line or perforation is provided. In FIG. 24, this region is indicated by a dotted circle. The rip strip 3 at least partially covers such a region.

It may optionally be provided that the rip strip is bonded to the closure, e.g., to a crimp 87.

As will be clear, in the embodiment of FIG. 23, it would also be possible to provide a different kind of closure, e.g., with a stopper or with a cap, and still guide the rip strip over that closure. And instead of having the main part 2 of the tag 1 attached to the bottom side of the vial body 82, it could be attached to a side wall, cf., e.g., FIG. 4, tag 1'.

FIG. 25 is a strongly schematized cross-sectional illustration of a package 10, wherein a tag 1 (or more particularly a main part 2 of a tag 1) is attached at a vial body 82, more particularly at a bottom wall (or bottom side) of the vial body 82. In particular, FIG. 25 illustrates a specific possibility of attaching a tag 1 at a bottom wall of a vial body 82, namely the possibility to provide a housing 41 of the tag 1, which encompasses the vial body 82 near the bottom of the vial. The housing 41 may be, as illustrated in FIG. 25, cup-shaped, the bottom of the vial body 82 and the electronics unit being accommodated in the housing 41 (in the "cup" thereof). The tag 1 is attached to the bottom wall of the vial body 82 by means of double-faced adhesive tape 15, wherein it would alternatively be possible, too, to use a glue therefor.

If a rip strip 3 is present, it may extend through an opening in housing 41, as illustrated in FIG. 25. Otherwise, the rip strip 3 may operate and be designed and arranged as described above or below.

The housing 41 may optionally and as illustrated in FIG. 25 include an elastomeric ring 41*a* at its side wall (e.g., close to its end), which is in contact with the (outside of the) side wall of the vial body 82. This may contribute to mechanical stability of the package 10. Such a housing 41 may be manufactured, e.g., using a two-component injection molding process. Thus, housing 41 may be a single molded part, even if provided with ring 41*a*. Ring 41*a* may also function as a seal or gasket for a portion of tag 1.

Like in case of the embodiment of FIG. 23, also in FIG. 24 the bottom of the package 10 (which usually is located opposite the open end of the vial body 82, i.e. opposite the opening of the vial) is established by the tag 1 (and not by the vial body); this applies also for tag 1 of FIG. 26.

Otherwise, the package 10 and in particular tag 1 may be as described elsewhere in the present patent application.

FIG. 26 is a strongly schematized cross-sectional illustration of a package 10, wherein a tag 1 is used, which is a tag 1 using printed electronics. In fact, two such tags, tag 1 and tag 1', are illustrated in FIG. 26, although usually only one single tag will be provided at one vial. Tag 1 is attached at a vial body 82, more particularly at a bottom wall (or bottom side) of the vial body 82. This tag 1 is attached to the bottom wall, e.g., by means of being provided, by itself, with a bonding material such a glue, or by providing a double-faced adhesive tape, or by applying a glue between the tag (in particular the substrate on which the electronics is printed) and the bottom wall.

The other tag 1' is attached to a side will off vial body 82 in a similar way as illustrated in FIG. 3, namely by means of applying a foil 18 sandwiching at least a portion of the tag 1' between itself and the vial body 82.

It is also possible to apply the attaching technique used for tag 1 for attaching tag 1' and, vice versa, to apply the attaching technique used for tag 1' for attaching tag 1.

In case a tag based on printed electronics is provided with a rip strip (not illustrated in FIG. 26), that rip strip may be continuous with the substrate of the printed electronics.

Otherwise, the package 10 and in particular tag 1 may be as described elsewhere in the present patent application.

FIG. 27 is a strongly schematized illustration of a detail of an electronic tag with pull-out tab or separating element 70 in an initial position, in a side view; FIG. 28 is a strongly schematized illustration of the detail of the electronic tag of FIG. 27, with pulled-out separating element 70, in a side view. The constituents shown in FIGS. 27, 28 can, together, be considered a part or an assembly, which may be manufactured separately from further parts of the tag and/or from further parts of the package. A housing of the tag, which possibly may be present, is not shown in FIGS. 27 and 28.

Several of the constituents shown in FIGS. 27 and 28 have been described above, wherein corresponding reference numerals have been applied to corresponding parts.

Providing a separating element or pull-out tab can be understood as an alternative (but possibly also as an addition) to providing a rip strip. Like a rip strip, a separating element 70 may be used in the process of starting the sensor measurement and/or a time measurement, the latter in particular in the case that the tag does not include a sensor and, thus, basically is a timer tag.

Unlike the ripping of a rip strip 3, the pulling out a separating element 70 usually does not effect an opening of an electrical circuit, but a closing of an electrical circuit (in particular a bridging of electrical contact elements). In the state illustrated in FIG. 27, a separating element 70 such as a polymer foil strip or another sheet-like insulating member is located between an electrical contact element 72, e.g., formed by battery contact lead 33, and another electric contact element 73, e.g., formed by printed circuit board 34 and more particularly by a contact pad thereof. The two electrical contact elements 72 and 73 form a spring-loaded contact, such that with separating element 70 removed from between them, they will form a closed electrical contact. In FIGS. 27, 28 the thick dashed line indicates an operational (more particularly: mechanical) connection between printed circuit board 34 and an end of contact element 72. The corresponding closing of an electrical contact or circuit can be detected by the tag (more particularly by the electronics unit, still more particularly by the control unit), e.g., by detecting the effected change in electrical resistance. In reaction to the detection, the sensor measurement and/or the time measurement may be started. In particular, the measurement may in this case be effected by powering the electronics unit of the tag, in other words by starting using (and thus draining) the battery. This can provide a greatly increased shelf life of the tag and of the corresponding package, because after manufacture (usually including testing), no power needs to be drained from the battery 42 before use is made of the vial. However, it is also possible to provide that after manufacture, the electronics unit is powered and remains powered until after pulling out the separating element 70, and the removal of the separating element 70 is mainly used as an indication that the sensor measurement (and/or the time measurement) has to start.

While in the state before pulling out the separating member 70 (cf. FIG. 27), a first end 70*a* of separating member 70 separates the electrical contact elements 72 and 73, the second (usually oppositely arranged) end 70*b* of separating member 70 may be manually accessible. But it is also possible to arrange and/or attach the second end 70*b* of separating element 70 in the same way as is described for the rip strip, cf., e.g., FIGS. 21-23.

A pull-out tab technique may be used in any of the described tags and packages. If the tag includes a housing, it is possible to provide that the separating element 35 extends through an opening of the housing out of the housing, e.g., like illustrated in FIG. 2 for rip strip 3.

While in FIGS. 27, 28, an LED 7 is illustrated, it is of course possible to provide a different kind of display; and the LED or the display may of course be located on the other side of printed circuit board 34.

Described arrangements of the tag 1 and the vial make possible to ensure that a person about to use the pharmaceutical product present in the vial will, practically inevitably, effect a displaying of the integrity status The tag, the package and the packaged pharmaceutical product described in the present patent application are easy to use and operable by untrained personnel, i.e. by people not specifically instructed on how to use the tag, the package, the packaged pharmaceutical product, as far as the integrity monitoring is concerned. Patients and health care specialists who apply or use the pharmaceutical product can, without additional measures and without the need of additional tools, check the integrity of the product to be applied or used. And this can be accomplished (at least approximately) at the time when the product is applied or used. Suitably positioning the tag and in particular the rip strip can make a display of status data (practically) unavoidable at the time the vial is about to be opened or at the time the pharmaceutical product is about to be used, cf. above.

It can happen that pharmaceutical products are returned from the acquirer or user (e.g., patient or health care specialist) to the manufacturer or the distributor without having been used. This sometimes is the case, e.g., in case of particularly valuable products.

If the product is returned to the manufacturer or distributor, the manufacturer or distributor can check the integrity status of the product by using the tag. Based thereon, it can, e.g., be decided whether or not to forward the product to another acquirer or user.

Independently of having checked the integrity status or not, it may be provided that the manufacturer or distributor forwards the product to another acquirer or user. That other acquirer or user can then (e.g., when the pharmaceutical product is about to be applied) check the integrity status of the product using the herein described tag and the package, respectively.

It shall be noted that the tag, the package and the packaged pharmaceutical product can provide standalone solutions which do not require further equipment, at least not for having the integrity status of the product displayed. And the attaching of the tag to the vial can be accomplished by the manufacturer or by the packaging company packaging the product in a box.

The tag may consist of merely
an electronics unit; and
a PCB (typically a flexible PCB) forming, if present, the rip strip, and the PCB on which the components of the electronics unit are mounted;
wherein the electronics unit may consist merely of
a switch (and possibly also a second switch—namely, e.g., for starting the monitoring);
one or more, typically two, light emitters, typically LEDs;
an integrated circuit (embodying at least the control unit); and
an energy source such as a battery;
wherein, if the one or more sensors are not integrated in the integrated circuit, at least one sensor is, in addition, provided, too, in the electronics unit, and
wherein optionally up to four capacitors and/or up to four resistors may be provided, too, in the electronics unit. And typically, all components provided in the electronics unit are mounted on the PCB, more precisely on one and the same PCB.

Note that the PCB can be sufficient for electrically contacting the energy source (battery), cf. FIGS. 2, 3, such that no separate battery holder or battery holder leads needs to be provided. However, the battery may be contacted by one or more (typically two) contact leads—which again are operationally (and usually galvanically) connected to the PCB, cf. FIGS. 18, 19.

And note furthermore, that it is possible that the rip strip is dispensed with (at least in its function as providing a means for starting the monitoring) and/or the switch may be dispensed with (at least in its function as a means for requesting a displaying of the status data, and this at least for times not coinciding with the time of terminating the monitoring).

A display of an above-described kind can be particularly small and cost-efficient. There is no need for a liquid crystal display or the like. However, it is possible to provide as the display of the tag a liquid crystal display or some other kind of display capable of displaying characters (letters) and/or numbers (digits) (alphanumerical display).

The invention claimed is:

1. A package for a pharmaceutical product, said package comprising
a vial;
an electronic tag for obtaining information relating to the integrity of the product as assessed from an exposure of said product to physical or environmental conditions during a time span;
wherein
I) said tag is attached at or to a constituent of said vial; or
II) at least a portion of said tag is integrated in a constituent of said vial;
and wherein said tag comprises an electronics unit comprising
a control unit;
a sensor unit comprising at least one sensor for monitoring said physical or environmental conditions;
a display unit comprising a display for displaying data relating to said integrity referred to as status data;
a switch;
wherein said control unit is structured and configured for effecting that said display unit displays said status data in reaction to an operation of said switch; and,
wherein the tag comprises a rip strip comprising a breakable electrical connection operationally connected to said control unit.

2. The package according to claim 1, wherein said constituent of said vial is at least one of
a vial body of the vial;
a closure of the vial;
a part of a closure of the vial;
a seal of the vial;
a cap of the vial.

3. The package according to claim 1, wherein a housing of said tag is integrated in said constituent of said vial.

4. The package according to claim 1, wherein the tag is attached to or at said constituent of the vial, and wherein at least a portion of said constituent of the vial is at least partially encompassed by the tag or by a constituent of the tag.

5. The package according to claim 3, wherein said housing and said constituent of said vial are integrally formed.

6. The package according to claim 1, wherein the tag comprises a housing comprising a first and a second housing portion which are mutually attachable by establishing a snap fit with one another.

7. The package according to claim 1, wherein a breaking of said breakable electrical connection indicates the end of said time span or the beginning of said time span.

8. The package according to claim 7, wherein said rip strip is attached to or fixed at a vial body of the vial.

9. The package according to claim 1, wherein said display unit comprises one or more light emitters for emitting light pulses, and wherein said status data is encoded in a sequence of light pulses emitted by said one or more light emitters.

10. A packaged pharmaceutical product, comprising a package according to claim 1 and said pharmaceutical product, wherein said pharmaceutical product is contained in a vial body of said vial.

11. A method for monitoring an integrity of a pharmaceutical product, the method comprising the steps of
a) providing a vial;
b) providing
I) an electronic tag attached at or to a constituent of said vial; or
II) an electronic tag at least a portion of which is integrated in the constituent of said vial;

said vial comprising a vial body, said vial body containing said pharmaceutical product;
said tag being a tag for obtaining information relating to the integrity of said product as assessed from an exposure of said product to physical or environmental conditions during a time span, the tag comprising an electronics unit comprising
a control unit;
a sensor unit comprising at least one sensor for monitoring said physical or environmental conditions;
a display unit comprising a display for displaying data relating to said integrity referred to as status data;
a switch;
wherein said control unit is structured and configured for effecting that said display unit displays said status data in reaction to an operation of said switch; and, wherein said tag comprises a rip strip comprising a breakable electrical connection operationally connected to said control unit.

* * * * *